(12) United States Patent
Hashimoto et al.

(10) Patent No.: US 10,969,304 B2
(45) Date of Patent: Apr. 6, 2021

(54) STATE DETECTION SYSTEM FOR INTERNAL COMBUSTION ENGINE, DATA ANALYSIS DEVICE, AND VEHICLE

(71) Applicant: TOYOTA JIDOSHA KABUSHIKI KAISHA, Toyota (JP)

(72) Inventors: Yosuke Hashimoto, Nagakute (JP); Akihiro Katayama, Toyota (JP); Yuta Oshiro, Nagoya (JP); Kazuki Sugie, Toyota (JP); Naoya Oka, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/785,739

(22) Filed: Feb. 10, 2020

(65) Prior Publication Data

US 2020/0264074 A1 Aug. 20, 2020

(30) Foreign Application Priority Data

Feb. 15, 2019 (JP) .............................. JP2019-025553
Feb. 21, 2019 (JP) .............................. JP2019-029400
Aug. 20, 2019 (JP) .............................. JP2019-150189

(51) Int. Cl.
*G01M 15/11* (2006.01)
*F02D 41/14* (2006.01)
(Continued)

(52) U.S. Cl.
CPC ......... *G01M 15/11* (2013.01); *F02D 41/1498* (2013.01); *F02D 35/023* (2013.01);
(Continued)

(58) Field of Classification Search
CPC ................ G01M 15/11; F02D 41/1498; F02D 2200/1004; F02D 2041/288; F02D 41/22;
(Continued)

(56) References Cited

U.S. PATENT DOCUMENTS 5,093,792 A 3/1992 Taki et al.
5,442,955 A 8/1995 Baba et al.
(Continued)

FOREIGN PATENT DOCUMENTS

EP 2 123 891 A1 11/2009
JP 57-126527 A 8/1982
(Continued)

OTHER PUBLICATIONS

Extended European Search Report dated Jul. 8, 2020 in European Patent Application No. 20155682.6, 10 pages.
(Continued)

*Primary Examiner* — Xiao En Mo
(74) *Attorney, Agent, or Firm* — Oblon, McClelland, Maier & Neustadt, L.L.P.

(57) ABSTRACT

A state detection system for an internal combustion engine is provided. A detection mapping takes, as inputs, rotation waveform variables and a road surface state variable to output a combustion state variable. The rotation waveform variables include information on a difference between cylinders in the rotational speed NE of a crankshaft during periods in which the respective cylinders generate combustion torque. The combustion state variable relates to a level of variations in combustion state among the cylinders. A determination process performed by an execution device determines whether the internal combustion engine is in a predetermined operating state based on an output value of the detection mapping that takes, as inputs, values of the rotation waveform variables and a value of the road surface state variable.

9 Claims, 10 Drawing Sheets

(51) Int. Cl.
*F02D 35/02* (2006.01)
*F02D 41/22* (2006.01)
*F02D 41/28* (2006.01)

(52) U.S. Cl.
CPC .......... *F02D 41/1405* (2013.01); *F02D 41/22* (2013.01); *F02D 2041/288* (2013.01); *F02D 2200/1004* (2013.01); *F02D 2200/1015* (2013.01)

(58) Field of Classification Search
CPC .......... F02D 2200/1015; F02D 35/023; F02D 41/1405
See application file for complete search history.

(56) References Cited

U.S. PATENT DOCUMENTS

| | | | |
|---|---|---|---|
| 5,495,415 | A | 2/1996 | Ribbens et al. |
| 5,539,644 | A | 7/1996 | Ichikawa et al. |
| 5,576,963 | A | 11/1996 | Ribbens et al. |
| 5,687,692 | A | 11/1997 | Togai et al. |
| 6,199,057 | B1 | 3/2001 | Tawel |
| 6,292,738 | B1 | 9/2001 | Feldkamp et al. |
| 6,434,541 | B1 | 8/2002 | Tawel et al. |
| 2003/0163242 | A1 | 8/2003 | Miyauchi et al. |
| 2010/0294027 | A1 | 11/2010 | Kondo et al. |
| 2011/0072893 | A1 | 3/2011 | Malaczynski |
| 2012/0192633 | A1 | 8/2012 | Hakariya et al. |
| 2015/0088368 | A1* | 3/2015 | Varady .................. B60W 40/06 701/31.7 |
| 2015/0260610 | A1 | 9/2015 | Shiwa |
| 2016/0299035 | A1 | 10/2016 | Choi |
| 2017/0067405 | A1 | 3/2017 | Nakano |
| 2017/0072922 | A1* | 3/2017 | Hanatsuka .............. B60T 8/172 |
| 2018/0340863 | A1 | 11/2018 | Miura et al. |

FOREIGN PATENT DOCUMENTS

| | | | |
|---|---|---|---|
| JP | 1-301946 A | | 12/1989 |
| JP | 4-91348 A | | 3/1992 |
| JP | 5-86958 A | | 4/1993 |
| JP | 10-159637 A | | 6/1998 |
| JP | 10-252536 A | | 9/1998 |
| JP | 2000-220489 A | | 8/2000 |
| JP | 2001-507772 A | | 6/2001 |
| JP | 2004-52620 A | | 2/2004 |
| JP | 2004-263680 A | | 9/2004 |
| JP | 2006-207476 A | | 8/2006 |
| JP | 2009-174397 A | | 8/2009 |
| JP | 2012-47089 A | | 3/2012 |
| JP | 2012-154300 | | 8/2012 |
| JP | 2012214224 A | * | 11/2012 |
| JP | 2012215178 A | * | 11/2012 |
| JP | 2013-194685 A | | 9/2013 |
| JP | 2015-169191 A | | 9/2015 |
| JP | 2017-155712 A | | 9/2017 |
| JP | 2018-135844 A | | 8/2018 |
| JP | 2018-178810 A | | 11/2018 |
| JP | 2019-19755 A | | 2/2019 |
| WO | WO 2014/069194 A1 | | 5/2014 |

OTHER PUBLICATIONS

Extended European Search Report dated Jul. 14, 2020 in European Patent Application No. 20155691.7, 8 pages.
Office Action dated Feb. 9, 2021 in co-pending U.S. Appl. No. 16/785,705.

* cited by examiner

STATE DETECTION SYSTEM FOR INTERNAL COMBUSTION ENGINE, DATA ANALYSIS DEVICE, AND VEHICLE

BACKGROUND

1. Field

The present disclosure relates to a state detection system for an internal combustion engine. The present disclosure also relates to a data analysis device and a vehicle that are parts of the state detection system for an internal combustion engine. The state detection system for an internal combustion engine is used to detect an operating state that is accompanied by variations in combustion state among cylinders, such as variations in misfires or air-fuel ratio among cylinders, in the internal combustion engine mounted on a vehicle.

2. Description of Related Art

In an internal combustion engine, variations in combustion state among cylinders, which may be caused by misfires or variations in air-fuel ratio among cylinders, increase the fluctuation in the rotation of the crankshaft. As such, misfires or variations in air-fuel ratio among cylinders can be detected from the fluctuation pattern of the rotation of the crankshaft. For example, Japanese Laid-Open Patent Publication No. 4-91348 discloses a misfire detection system that detects misfires using a hierarchical neural network model. The input layer of this hierarchical neural network model takes time series data of the rotational speed of the crankshaft in the internal combustion engine, which is obtained in predetermined cycles. The neural network outputs information on the misfiring cylinders from its output layer.

Unevenness in the road surface vibrates the vehicle, and this vibration is transferred to the crankshaft. That is, the vibration caused by the road surface is superposed on the rotation of the crankshaft. This lowers the accuracy in detecting misfires or other problems based on the fluctuation pattern of the rotational behavior of the crankshaft while the vehicle is traveling.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Examples of the present disclosure will now be described.

One aspect of the present disclosure is a state detection system for an internal combustion engine that is configured to be used in the internal combustion engine mounted on a vehicle to detect a predetermined operating state of the internal combustion engine that is accompanied by variations in combustion state among cylinders. The state detection system includes a storage device configured to store mapping data that defines a detection mapping. The detection mapping takes, as inputs, rotation waveform variables and a road surface state variable to output a combustion state variable. The rotation waveform variables include information on a difference between cylinders in rotational speed NE of a crankshaft of the internal combustion engine during periods in which the respective cylinders generate combustion torque. The road surface state variable relates to a state of the road surface on which the vehicle is traveling. The combustion state variable relates to a level of variations in combustion state among the cylinders. The detection mapping outputs a value of the combustion state variable by computing a combination of the rotation waveform variables and the road surface state variable based on parameters learned by machine learning. The state detection system also includes an execution device configured to perform an obtainment process and a determination process. The obtainment process obtains values of the rotation waveform variables based on an output of a sensor that detects rotational behavior of the crankshaft, and obtains a value of the road surface state variable based on an output of a sensor that detects a road surface state. The determination process determines whether the internal combustion engine is in the predetermined operating state based on an output value of the detection mapping that takes, as inputs, the values of the rotation waveform variables and the value of the road surface state variable, which are obtained in the obtainment process.

Variations in combustion state among cylinders cause variations in combustion torque among the cylinders. This results in a difference between cylinders in the rotational speed of the crankshaft during periods in which the respective cylinders generate combustion torque. Information on this difference between the cylinders in the rotational speed of the crankshaft can be obtained from the output of a sensor that detects the rotational behavior of the crankshaft. If the difference between cylinders in the rotational speed of the crankshaft during periods in which the respective cylinders generate combustion torque is caused only by variations in combustion state among cylinders, the information on the difference between cylinders in rotational speed can be used to accurately detect the operating state of the internal combustion engine that is accompanied by variations in combustion state among cylinders, such as misfires or an imbalance in air-fuel ratio among cylinders. Variations in combustion state among cylinders cause a difference between cylinders in the rotational speed of the crankshaft during periods in which the respective cylinders generate combustion torque. For this reason, in the configuration described above, the inputs to the detection mapping include the rotation waveform variables, which include information on differences between cylinders in rotational speed.

Unevenness in the road surface on which the vehicle is traveling may vibrate the vehicle. This vibration is transferred to the crankshaft of the internal combustion engine mounted on the vehicle. Thus, the road surface state affects the rotational behavior of the crankshaft. For this reason, this configuration includes the road surface state variable, which relates to the road surface state, in the inputs of the detection mapping. The configuration determines the presence or absence of the predetermined operating state based on the value of the combustion state variable obtained by computing a combination of the rotation waveform variables and the road surface state variable based on parameters learned by machine learning. These parameters may be learned based on data indicating whether the predetermined operating state has occurred when the rotation waveform variables and the road surface state variable take various values. The combustion state variable is thus calculated by taking account of the effects of the state of the road surface on which the vehicle is traveling. Accordingly, the configuration increases the accuracy in detecting the predetermined operating state in the internal combustion engine mounted on the vehicle.

The state detection system can be configured as a system that detects a state in which a misfire has occurred. In addition, the state detection system can be configured as a system that detects a state in which variations in air-fuel ratio among cylinders have occurred.

The road surface state variable used in the state detection system may be a variable indicating whether the road surface on which the vehicle is traveling is a paved road or an unpaved road.

In one aspect of the state detection system, the execution device is configured to perform, when the determination process determines that the internal combustion engine is in the predetermined operating state, a response process that operates hardware to respond to the predetermined operating state. The response process may be a process of notifying the driver that the internal combustion engine is in the predetermined operating state, or a process of eliminating or mitigating the predetermined operating state.

In one aspect of the state detection system, the determination process includes an output value calculation process that calculates the combustion state variable, which is an output value of the detection mapping. The detection mapping takes, as inputs, values of the rotation waveform variables and a value of the road surface state variable, which are obtained in the obtainment process. The execution device includes a first execution device mounted on the vehicle and a second execution device mounted on an apparatus that is separate from the vehicle. The first execution device is configured to perform the obtainment process and a vehicle-side reception process that receives a signal based on the calculation result of the output value calculation process. The second execution device is configured to perform the output value calculation process and an external transmission process that transmits to the vehicle the signal based on the calculation result of the output value calculation process.

Another aspect of the present disclosure is a state detection system for an internal combustion engine, the system being configured to be used for the internal combustion engine mounted on a vehicle to detect a predetermined operating state of the internal combustion engine that is accompanied by variations in combustion state among cylinders, the state detection system comprising:

a first execution device;
a second execution device; and
a storage device, wherein
the storage device is configured to store mapping data that defines a detection mapping,
the detection mapping takes, as inputs, rotation waveform variables and a road surface state variable to output a combustion state variable,
the rotation waveform variables include information on a difference between cylinders in the rotational speed NE of a crankshaft of the internal combustion engine during periods in which the respective cylinders generate combustion torque,
the road surface state variable relates to a state of a road surface on which the vehicle is traveling,
the combustion state variable relates to a level of variations in combustion state among the cylinders,
the detection mapping outputs a value of the combustion state variable by computing a combination of the rotation waveform variables and the road surface state variable based on parameters learned by machine learning,
the first execution device is mounted on the vehicle,
the first execution device is configured to perform:
an obtainment process that obtains values of the rotation waveform variables based on an output of a sensor that detects rotational behavior of the crankshaft, and obtains a value of the road surface state variable based on an output of a sensor that detects a road surface state; and
a vehicle-side reception process that receives a signal based on a calculation result of the output value calculation process,
the second execution device is mounted on an apparatus that is separate from the vehicle,
the second execution device is configured to perform:
an output value calculation process that calculates the combustion state variable, which is an output value of the detection mapping that takes, as inputs, the values of the rotation waveform variables and the value of the road surface state variable, which are obtained in the obtainment process; and
an external transmission process that transmits to the vehicle the signal based on the calculation result of the output value calculation process,
the second execution device or both of the first and second execution devices are configured to perform a determination process including the output value calculation process, and
the determination process determines whether the internal combustion engine is in the predetermined operating state based on the combustion state variable.

In this configuration, the output value calculation process involving a high computation load is performed by an apparatus that is separate from the vehicle. The computation load in the vehicle is thus reduced. This state detection system may include a data analysis device including the second execution device and the storage device, and a vehicle including the first execution device.

A further aspect of the present disclosure is a method for detecting a state of an internal combustion engine including the various processes described above.

A further aspect of the present disclosure is a non-transitory computer-readable storage medium storing a program that causes an execution device to perform the various processes described above.

The combustion state variable is an imbalance variable that represents a level of variations in the actual air-fuel ratios that occur under the condition where the fuel injection valves of the internal combustion engine are operated to control the cylinders to have a uniform air-fuel ratio of the mixture.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

Figure 1:
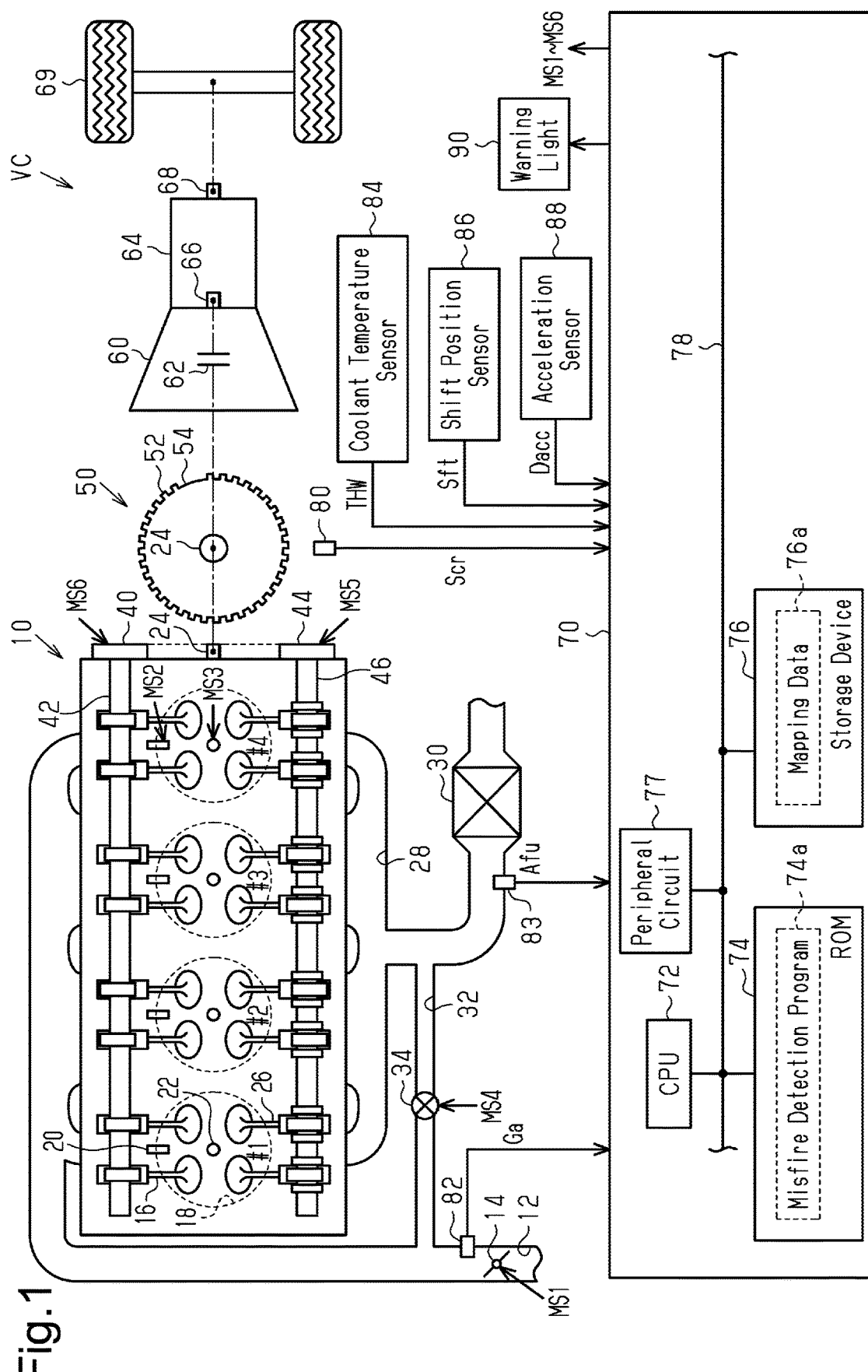
FIG. 1 is a diagram showing a configuration of a driveline of a vehicle having a state detection system of a first embodiment and an internal combustion engine for which the state detection system is used.
Figure 2:
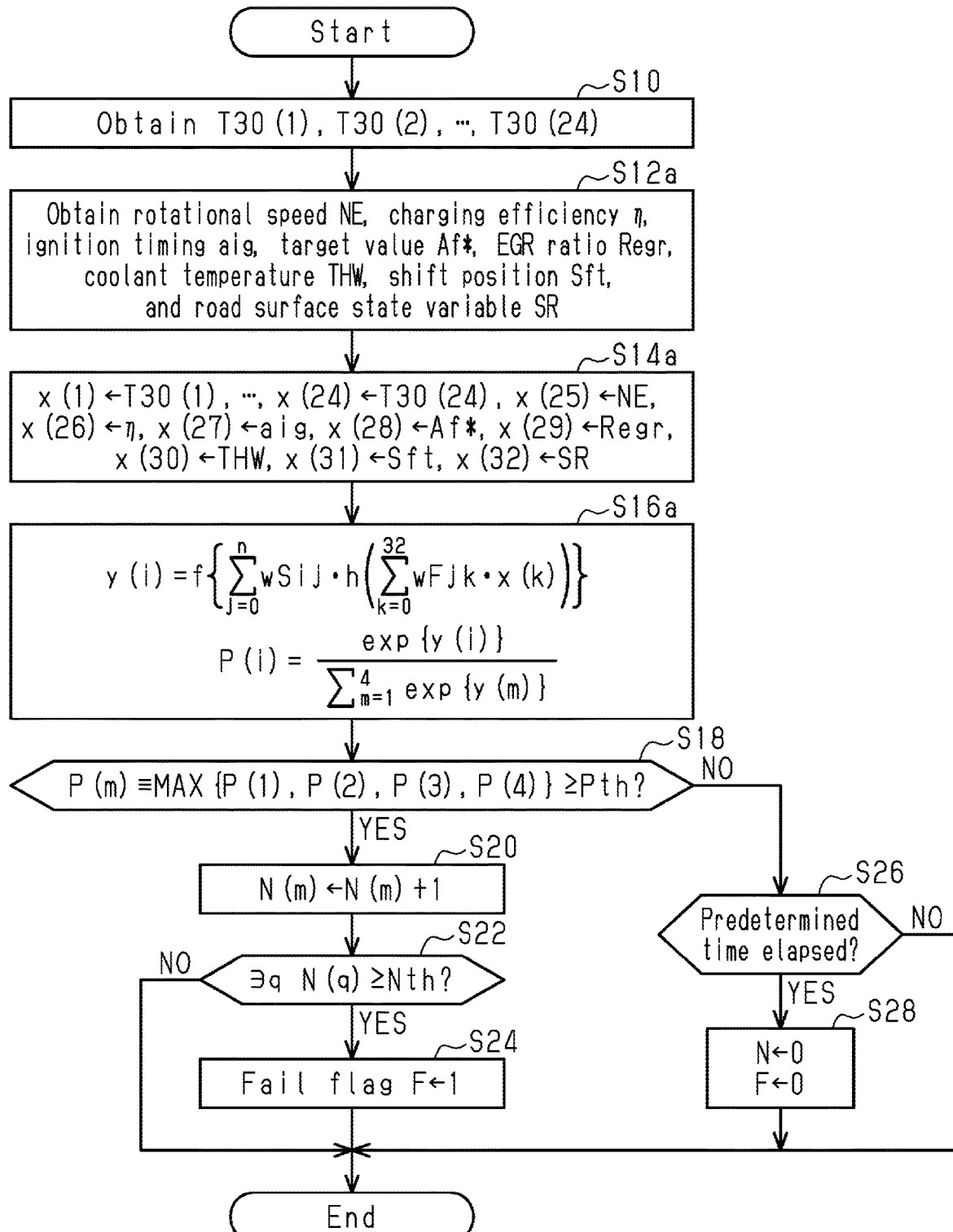
FIG. 2 is a flowchart showing the procedure of a misfire detection process according to the first embodiment.
Figure 3:
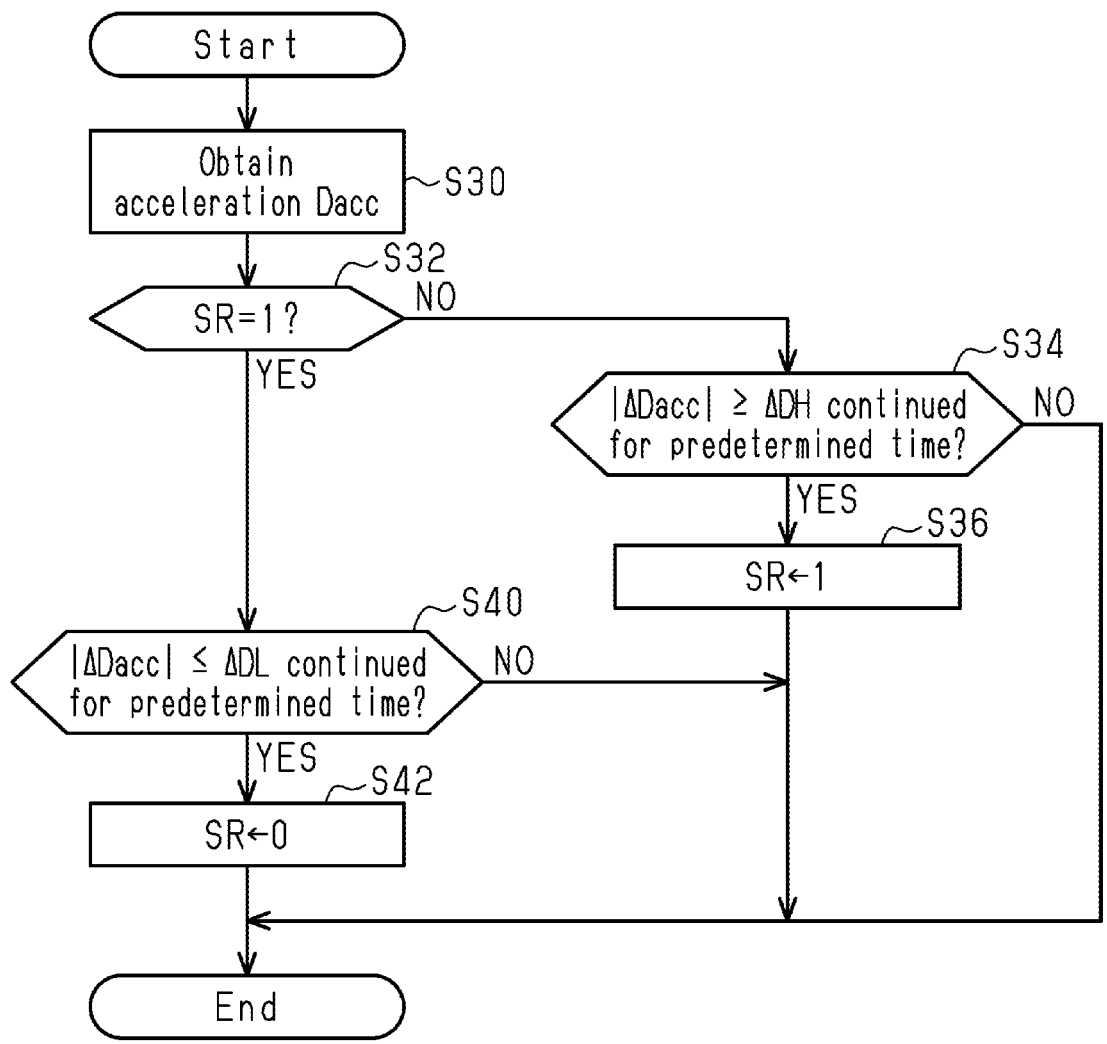
FIG. 3 is a flowchart showing the procedure of a calculation process of a road surface state variable according to the first embodiment.

Referring to FIGS. 1 to 3, a first embodiment of a state detection system for an internal combustion engine is now described.

FIG. 1 shows an internal combustion engine 10 mounted to a vehicle VC. The internal combustion engine 10 has an intake passage 12 including a throttle valve 14. The intake air in the intake passage 12 flows into the combustion chambers 18 of cylinders #1 to #4 when the intake valves 16 are open. The internal combustion engine 10 includes fuel injection valves 20, which inject fuel, and ignition devices 22, which generate spark discharge. The fuel injection valves 20 and the ignition devices 22 are exposed to the combustion chambers 18. The air-fuel mixture is burned in the combustion chambers 18, and the energy generated by the combustion is output as the rotation energy for the crankshaft 24. The air-fuel mixture used for combustion is discharged as exhaust gas into the exhaust passage 28 when the exhaust valves 26 are open. The exhaust passage 28 includes a catalyst 30 with oxygen storage capacity. The exhaust passage 28 communicates with the intake passage 12 via an EGR passage 32. The EGR passage 32 includes an EGR valve 34 for adjusting the cross-sectional area of the flow passage.

The rotational force of the crankshaft 24 is transmitted to an intake camshaft 42 via an intake variable valve timing system 40. The rotational force is also transmitted to an exhaust camshaft 46 via an exhaust variable valve timing system 44. The intake variable valve timing system 40 alters the difference between the rotation phases of the intake camshaft 42 and the crankshaft 24. The exhaust variable valve timing system 44 alters the difference between the rotation phases of the exhaust camshaft 46 and the crankshaft 24.

The crankshaft 24 of the internal combustion engine 10 is connectable to an input shaft 66 of a transmission 64 via a torque converter 60. The torque converter 60 includes a lockup clutch 62, and the crankshaft 24 is connected to the input shaft 66 when the lockup clutch 62 is in an engaged position. The transmission 64 also has an output shaft 68 mechanically coupled to drive wheels 69. In the present embodiment, the transmission 64 is a stepped transmission that has first to sixth gear ratios.

The crankshaft 24 is connected to a crank rotor 50 having teeth 52 each indicating a corresponding one of a plurality of (thirty-four in this example) rotational angles of the crankshaft 24. The teeth 52 are positioned on the crank rotor 50 at intervals of 10° CA, except for one missing-teeth part 54 where adjacent teeth 52 are spaced apart from each other by 30° CA. This part indicates the reference rotational angle of the crankshaft 24.

A controller 70 controls the internal combustion engine 10 and operates the throttle valve 14, the fuel injection valves 20, the ignition devices 22, the EGR valve 34, the intake variable valve timing system 40, and the exhaust variable valve timing system 44 to control the controlled variables of the internal combustion engine 10, such as the torque and exhaust gas composition ratio. FIG. 1 shows operation signals MS1 to MS6 for the throttle valve 14, the fuel injection valves 20, the ignition devices 22, the EGR valve 34, the intake variable valve timing system 40, and the exhaust variable valve timing system 44.

To control controlled variables, the controller 70 refers to an output signal Scr of a crank angle sensor 80, which outputs a pulse for each angular interval between the teeth 52, that is, 10° CA except for the missing-teeth part 54. The controller 70 also refers to the intake air amount Ga, which is detected by an air flowmeter 82, and the upstream detection value Afu, which is a detection value of an air-fuel ratio sensor 83 located upstream of the catalyst 30. Further, the controller 70 refers to the coolant temperature THW, which is the temperature of the coolant of the internal combustion engine 10 detected by a coolant temperature sensor 84, the shift position Sft of the transmission 64 detected by a shift position sensor 86, and the acceleration Dacc in the vertical direction of the vehicle VC detected by an acceleration sensor 88.

The controller 70 includes a CPU 72, a ROM 74, a storage device 76, which is an electrically rewritable nonvolatile memory, and peripheral circuits 77, which can communicate with one another via a local network 78. The peripheral circuits 77 include a circuit that generates clock signals for regulating the internal operation, a power supply circuit, and a reset circuit.

The CPU 72 executes a program stored in the ROM 74 allowing the controller 70 to control the controlled variables. In addition, the controller 70 performs a process of determining the presence or absence of misfires in the internal combustion engine 10. That is, in the present embodiment, the predetermined operating state is an operating state in which a misfire has occurred, and the state detection system is the controller 70 that detects the presence or absence of a misfire.

FIG. 2 shows a procedure of a misfire detection process, which detects the presence or absence of misfires. To perform the misfire detection process shown in FIG. 2, the CPU 72 may repeatedly execute a misfire detection program, which is a program 74a stored in the ROM 74 shown in FIG. 1, in predetermined cycles. In the following descriptions, the numbers prefixed with S represent step numbers in each process.

In the process shown in FIG. 2, the CPU 72 first obtains minute rotation durations T30(1), T30(2), . . . , T30(24) (S10). Based on the output signal Scr from the crank angle sensor 80, the CPU 72 obtains a minute rotation duration T30 by measuring the time required for the crankshaft 24 to rotate 30° CA. Different numbers in parentheses, such as in minute rotation durations T30(1) and T30(2), represent different rotational angular intervals within the range of 720° CA corresponding to one combustion cycle. That is, the 720° CA rotational angle range (the first interval) is divided into equal 30° CA angular intervals (the second intervals), and minute rotation durations T30(1) to T30(24) correspond to respective second intervals. In other words, each minute rotation duration T30 is an instantaneous speed parameter (an instantaneous speed variable) corresponding to the rotational speed at which the crankshaft 24 rotates by the corresponding one of the angular intervals (30° CA, or second intervals). Here, the first interval is a rotational angular interval of the crankshaft 24 in which compression top dead center occurs. The second interval is smaller than an interval between compression top dead center positions. The minute rotation durations T30 are time series data of instantaneous speed parameters, each corresponding to one of a plurality of successive second intervals in the first interval.

Specifically, based on the output signal Scr, the CPU 72 measures the time required for the crankshaft 24 to rotate 30° CA, and sets this time as an unfiltered duration NF30. Then, the CPU 72 obtains filtered durations AF30 by applying a digital filter to unfiltered durations NF30. The CPU 72 then obtains the minute rotation durations T30 by normalizing the filtered durations AF30 such that the difference between the local maximum (maximum value) and the local minimum (minimum value) of the filtered durations AF30 measured in a predetermined period, such as 720° CA, is 1.

Next, the CPU 72 obtains the rotational speed NE, the charging efficiency η, the ignition timing aig, the air-fuel ratio target value Af*, the EGR ratio Regr, the coolant temperature THW, the shift position Sft, and the road surface state variable SR (S12a)

The CPU 72 calculates the rotational speed NE based on the output signal Scr of the crank angle sensor 80, and calculates the charging efficiency η based on the rotational speed NE and the intake air amount Ga. The rotational speed NE is the average rotational speed obtained when the crankshaft 24 rotates by an angular interval larger than the interval between compression top dead center positions, which is 180° CA in this embodiment. The rotational speed NE is preferably the average rotational speed obtained when the crankshaft 24 rotates by the rotational angle corresponding to one revolution of the crankshaft 24 or more. The average does not have to be a simple average, and may be an exponential moving average. The average may be calculated from a plurality of sampled values such as minute rotation durations T30 obtained when the crankshaft 24 rotates by a rotational angle that corresponds to one revolution or more. The charging efficiency η is a parameter that determines the amount of air charged into the combustion chambers 18. The EGR ratio Regr is the ratio of the fluid flowing into the intake passage 12 from the EGR passage 32 to the fluid flowing in the intake passage 12. The road surface state variable SR is a parameter calculated by the CPU 72 based on the acceleration Dacc. For example, the road surface state variable SR may be a binary variable that takes two values, one for when the road surface on which vehicle VC is traveling is rough and the other for when the road surface is smooth.

In the present embodiment, the road surface state variable SR is 0 when the vehicle VC is traveling on a paved road. The road surface state variable SR is 1 when the vehicle VC is traveling on an unpaved road. FIG. 3 shows the calculation process of the road surface state variable SR. To perform the process shown in FIG. 3, the CPU 72 may repeatedly execute the program stored in the ROM 74 in predetermined cycles.

In the process shown in FIG. 3, the CPU 72 first obtains the acceleration Dacc (S30). The CPU 72 then determines whether the road surface state variable SR is 1 (S32). When determining that the road surface state variable SR is 0 (S32: NO), the CPU 72 then determines whether a state in which the absolute value of the change amount ΔDacc of the acceleration Dacc is greater than or equal to a predetermined value ΔDH has continued for a predetermined time (S34). The change amount ΔDacc may be the difference between the previous value and the current value of the acceleration Dacc. This step determines whether the vehicle VC is traveling on a paved road. When determining that a state in which the absolute value of the change amount ΔDacc is greater than or equal to the predetermined value ΔDH has continued for the predetermined time (S34: YES), the CPU 72 assigns 1 to the road surface state variable SR and updates the road surface state variable SR (S36). The CPU 72 then ends this sequence.

When determining that the road surface state variable SR is 1 (S32: YES), the CPU 72 determines whether a state in which the absolute value of the change amount ΔDacc of the acceleration Dacc is less than or equal to a specified value ΔDL (<ΔDH) has continued for the predetermined time (S40). When determining that a state in which the absolute value of the change amount ΔDacc is less than or equal to the specified value ΔDL has continued for the predetermined time (S40: YES), the CPU 72 assigns 0 to the road surface state variable SR and updates the road surface state variable SR (S42). The CPU 72 then ends this sequence.

When determining that the outcome is negative at step S34 or S40 (S34: NO, S40: NO), the CPU 72 ends this sequence without updating the road surface state variable SR.

As shown in FIG. 2, after obtaining the rotational speed NE, the charging efficiency η, the ignition timing aig, the target value Af*, the EGR ratio Regr, the coolant temperature THW, the shift position Sft, and the road surface state variable SR at step S12a, the CPU 72 assigns the values obtained at steps S10 and S12a to the input variables x(1) to x(32) of the mapping for calculating probabilities that misfires have occurred (S14a). Specifically, the CPU 72 assigns minute rotation durations T30(s) to input variables x(s), so that s is 1 to 24. That is, the input variables x(1) to x(24) are time series data of the minute rotation durations T30. In this embodiment, the time series data of the minute rotation durations T30 corresponds to rotation waveform variables. In addition, the CPU 72 assigns the rotational speed NE to the input variable x(25) and assigns the charging efficiency η to the input variable x(26). The CPU 72 also assigns the ignition timing aig, the target value Af*, the EGR ratio Regr, the coolant temperature THW, the shift position Sft, and the road surface state variable SR to the input variables x(27) to x(32).

The ignition timing aig, the target value Af*, and the EGR ratio Regr are moderator variables that are adjusted by operating operation portions of the internal combustion engine 10 to control the combustion speed of the air-fuel mixture in the combustion chambers 18. That is, the ignition timing aig corresponds to an operating amount of the ignition devices 22, which serve as operation portions. The ignition timing aig is a moderator variable that is adjusted by operating the ignition devices 22 to control the combustion speed. The target value Af* is a moderator variable that is adjusted by operating the fuel injection valves 20, which serve as operation portions, to control the combustion speed. The EGR ratio Regr is a moderator variable that is adjusted by operating the EGR valve 34, which serves as an operation portion, to control the combustion speed. The behavior of the crankshaft 24 varies with the combustion speed of air-fuel mixture. These moderator variables are added as input variables x because the combustion speed of the air-fuel mixture measured when no misfire is occurring is likely to influence the rotational behavior of the crankshaft 24 exhibited when misfires are occurring.

The coolant temperature THW is a state variable of the internal combustion engine 10 and is a parameter that changes the friction of the sliding portions, such as the friction between the pistons and the cylinders. Since the coolant temperature THW affects the rotational behavior of the crankshaft 24, the present embodiment includes the coolant temperature THW as an input variable x.

The shift position Sft is a state variable of the driveline system connected to the crankshaft 24. Different shift positions Sft have different inertia constants from the crankshaft 24 to the drive wheels 69, resulting in different rotational behaviors of the crankshaft 24. The shift position Sft is therefore used as an input variable x.

Unevenness in the road surface vibrates the vehicle VC, and this vibration is transferred to the crankshaft 24. Thus, the rotational behavior of the crankshaft 24 varies with the road surface state. The present embodiment therefore includes the road surface state variable SR as an input variable x.

The CPU 72 then inputs the input variables x(1) to x(32) to the mapping defined by the mapping data 76a, which is stored in the storage device 76 shown in FIG. 1, to calculate, as combustion state variables, probabilities P(i) that misfires have occurred in cylinder #i (i=1 to 4) (S16a). The mapping data 76a defines a mapping that outputs probabilities P(i) that misfires have occurred in cylinders #i in the period corresponding to the minute rotation durations T30(1) to T30(24) obtained at step S10. A probability P(i) is a quantified representation of the likelihood that a misfire has actually occurred, which is obtained based on the input variables x(1) to x(32). In the present embodiment, the maximum value of probabilities P(i) that misfires have occurred in cylinders #i is smaller than 1, and the minimum value is greater than 0. That is, in the present embodiment, the level of likelihood of an actual misfire is quantified into a continuous variable in the predetermined range that is greater than 0 and less than 1.

In the present embodiment, this mapping includes a neural network, which includes one intermediate layer, and the softmax function. The softmax function is used to normalize the outputs of the neural network so that the probabilities P(1) to P(4) of misfires add up to 1. The neural network includes input-side coefficients wFjk (j=0 to n, k=0 to 32) and activation functions h(x). The input-side coefficients wFjk define input-side linear mappings, and the activation functions h(x) are input-side nonlinear mappings that perform nonlinear transformation on the output of the respective input-side linear mappings. In the present embodiment, the hyperbolic tangent tan h(x) is used as the activation function h(x). The neural network also includes output-side coefficients wSij (i=1 to 4, j=0 to n) and activation functions f(x). The output-side coefficients wSij define output-side linear mappings, and the activation functions f(x) are output-side nonlinear mappings that perform nonlinear transformation on the output of the respective output-side linear mappings. In the present embodiment, the hyperbolic tangent tan h(x) is used as the activation function f(x). The value n indicates the number of dimensions in the intermediate layer. In the present embodiment, the value n is smaller than the number of dimensions (32 dimensions in this example) of the input variables x. Input-side coefficients wFj0 are bias parameters and used as coefficients for input variable x(0), which is defined as 1. Output-side coefficients wSi0 are bias parameters and multiplied by 1. For example, this may be achieved by defining that wF00·x(0)+wF01·x(1)+ . . . is identically infinite.

Specifically, the CPU 72 calculates original probabilities y(i), which are outputs of the neural network defined by the input-side coefficients wFjk, output-side coefficients wSij, and activation functions h(x) and f(x). The original probabilities y(i) are parameters correlated positively with the probability that misfires have occurred in cylinders #i. The CPU 72 inputs the original probabilities y(1) to y(4) to the softmax function and obtains probabilities P(i) that misfires have occurred in cylinders #i as outputs. In the following descriptions, this mapping is referred to as a detection mapping.

Then, the CPU 72 determines whether the maximum value P(m) of the probabilities P(1) to P(4) of misfires is greater than or equal to a threshold value Pth (S18). Here, the variable m takes a value from 1 to 4, and the threshold value Pth is set to a value greater than or equal to ½. When determining that the maximum value P(m) is greater than or equal to the threshold value Pth (S18: YES), the CPU 72 increments the number N(m) of misfire events of the cylinder #m with the maximum probability (S20). The CPU 72 then determines whether any of the numbers N(1) to N(4) is greater than or equal to a predetermined number Nth (S22). When determining that any of the numbers N(1) to N(4) is greater than or equal to the predetermined number Nth (S22: YES), the CPU 72 determines that misfires have occurred in a specific cylinder #q (q is one of 1 to 4) at a frequency exceeding the permissible level, and assigns 1 to a fail flag F (S24). The CPU 72 maintains the information on the misfiring cylinder #q by saving the information in the storage device 76, for example, at least until the misfire problem is resolved in this cylinder #q.

When determining that the maximum value P(m) is less than the threshold value Pth (S18: NO), the CPU 72 then determines whether a predetermined time has elapsed since step S24 or step S28, which will be described below, is performed (S26). This predetermined time is longer than the duration of one combustion cycle, and preferably ten times longer than one combustion cycle or longer.

When determining that the predetermined time has elapsed (S26: YES), the CPU 72 resets the numbers N(1) to N(4) and also resets the fail flag F (S28).

The CPU 72 ends the sequence shown in FIG. 2 when step S24 or S28 is completed or if the outcome is negative at step S22 or S26.

When the fail flag F is 1, as a response process for responding to the predetermined operating state, the controller 70 performs a notification process that operates the warning light 90 shown in FIG. 1 to prompt the user to respond to the problem.

The mapping data 76a may be generated as follows. In a test bench, the internal combustion engine 10 is operated with the crankshaft 24 connected to a dynamometer. Of the time points at which cylinders #1 to #4 are required to inject fuel, fuel injection is deactivated at time points that are randomly selected. For a cylinder in which fuel injection is deactivated, the value of probability P(i), which is a combustion state variable, is set to 1 as the output in the training data of a supervised learning. For a cylinder in which fuel injection is not deactivated, the value of probability P(i), which is a combustion state variable, is set to 0 in the output in the training data of the supervised learning. Then, values of probabilities P(i), which are combustion state variables, are calculated in a similar manner as step S16a using the inputs in the training data corresponding to the input variables x(1) to x(32) that are to be obtained at step S14a. The values of the input-side coefficients wFjk and output-side coefficients wSij are learned such that the differences between the calculated probabilities P(i) and the outputs in the training data of the supervised learning are minimized. Specifically, the values of the input-side coefficients wFjk and output-side coefficients wSij are learned such that the cross entropy is minimized.

In the present embodiment, the training data includes all the parameters obtained at S12a, a step equivalent to step S14a is performed, and a mapping is used that has input variables x of 32 dimensions. Here, the input variable x(0) is not counted as a dimension. The training data corresponding to a situation where the road surface state variable SR indicates that the vehicle VC is traveling on an unpaved road with a rough road surface may be generated while the load torque that acts on the crankshaft 24 when the vehicle vibrates is simulated using a dynamometer. Alternatively, the internal combustion engine 10 and the dynamometer may be placed and vibrated on a device that generates vibration, so that the load torque that acts on the crankshaft 24 when the vehicle vibrates is simulated. The training data may be generated under this condition.

In the present embodiment, the input variables x include moderator variables that control the combustion speed, a state variable of the internal combustion engine 10, a state variable of the driveline system, and a road surface state variable SR. Even though these parameters affect the rotational behavior of the crankshaft 24, it has been difficult to take them into account in a conventional method for determining the presence or absence of misfires based on the difference between the durations required for rotation in adjacent angular intervals. With a conventional method, taking these parameters into account would require an enormous amount of fitting time and is thus unrealistic. However, the present embodiment uses machine learning and thus allows these parameters to be taken into account within a practical fitting time range to build logic for determination of misfires.

The operation and advantages of the present embodiment will now be described.

While the internal combustion engine 10 is in operation, the CPU 72 sequentially calculates the minute rotation durations T30 and inputs, as rotation waveform variables, the minute rotation durations T30 corresponding to one combustion cycle to the detection mapping defined by the mapping data 76a, thereby obtaining probabilities P(1) to P(4) that misfires have occurred in respective cylinders #1 to #4. The minute rotation duration T30 is a parameter indicating the rotational speed of the crankshaft 24 corresponding to an angular interval (the second interval) smaller than 180° CA, which is the interval between compression top dead center positions. The minute rotation duration T30 for each 30° CA in one combustion cycle is input to the detection mapping. Further, the values of the input-side coefficients wFjk and the output-side coefficients wSij used for the computation on the minute rotation durations T30 are values that are learned by the machine learning. The probabilities P(i) of misfires are thus calculated based on the rotational behavior of the crankshaft 24 in minute time scale. Consequently, as compared to a configuration that determines the presence or absence of misfires based on the difference between the durations needed to rotate adjacent angular intervals that are substantially equal to the intervals between compression top dead center positions, the present embodiment determines the presence or absence of misfires based on more detailed information on the rotational behavior of the crankshaft 24. This increases the accuracy of misfire determination.

The present embodiment described above further has the following advantages.

(1) Unevenness in the road surface on which the vehicle VC is traveling may vibrate the vehicle VC on which the internal combustion engine 10 is mounted. This vibration is transferred to the crankshaft 24. That is, the road surface state affects the rotational behavior of the crankshaft 24. In this respect, the controller 70 uses the road surface state variable SR, which relates to the road surface state, as an input to the detection mapping. The controller 70 computes a combination using parameters learned by machine learning to combine the rotation waveform variables T30(1) to T30 (24) and the road surface state variable SR. The values of probabilities P(i), which are combustion state variables, are thus calculated. The presence or absence of misfires is determined based on these values of probabilities P(i). The combustion state variables are calculated by taking account of the effects of the state of the road surface on which the vehicle VC is traveling. This increases the accuracy of misfire detection in the internal combustion engine 10 mounted on the vehicle VC.

(2) The rotational speed NE and the charging efficiency η, which are operating point variables that define the operating point of the internal combustion engine 10, are used as inputs to the detection mapping. The operating amounts of the operation portions of the internal combustion engine 10, such as the fuel injection valves 20 and the ignition devices 22, are likely to be determined based on the operating point of the internal combustion engine 10. As such, the operating point variables include information on the operating amounts of the operation portions. By inputting the operating point variables to the detection mapping, the values of the combustion state variables are calculated using the information on the operating amounts of the operation portions. This allows the calculation of combustion state variables to reflect a change in the rotational behavior of the crankshaft 24 associated with the operating amounts, thereby increasing the accuracy of the calculated values.

In addition, the use of the operating point variables as input variables has the following advantage. The values of the combustion state variables are obtained by computing a combination of the rotation waveform variables and the operating point variables using the input-side coefficients wFjk, which are parameters learned by machine learning. This eliminates the need for obtaining values fitted to each operating point variable.

Second Embodiment

Figure 4:
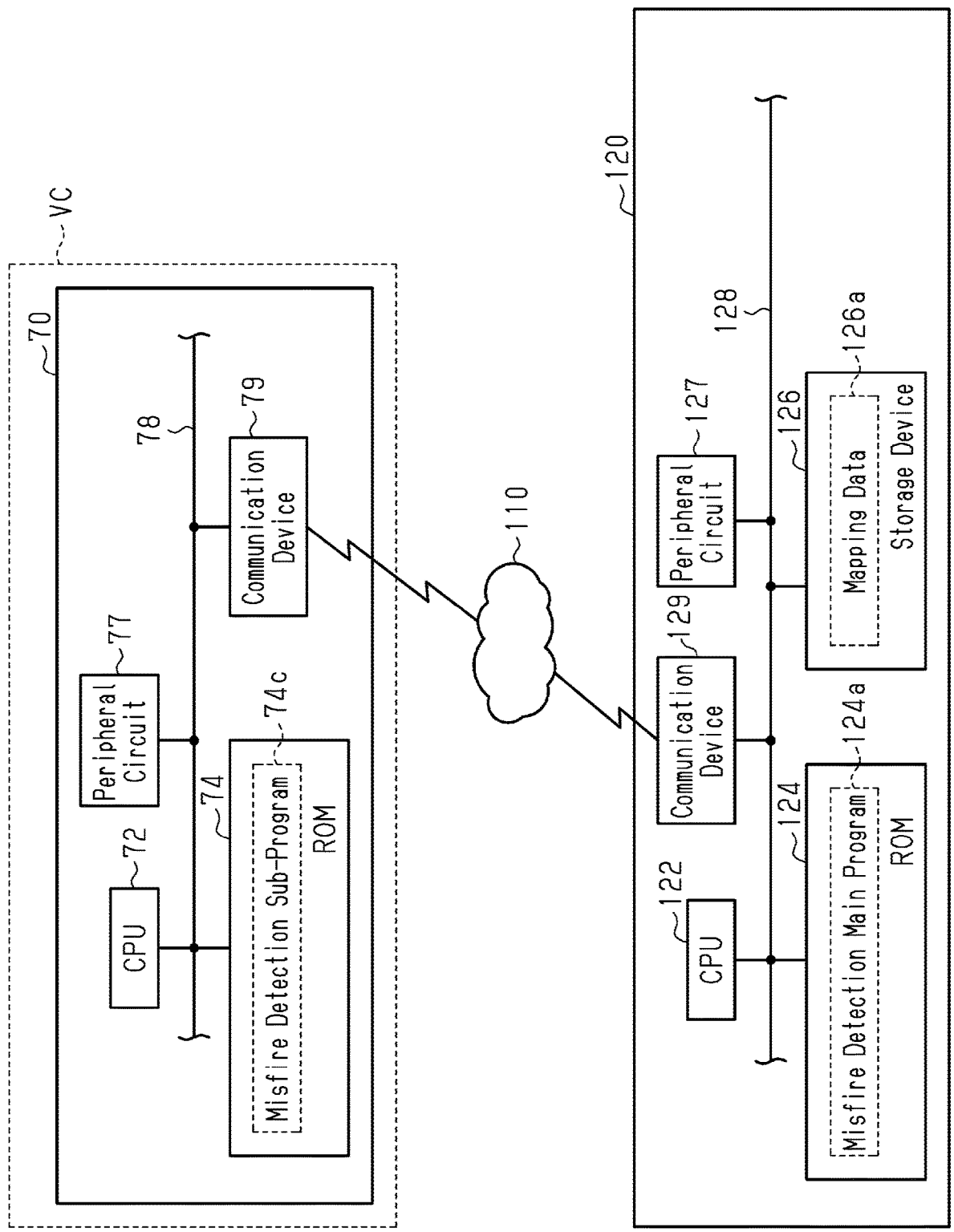
FIG. 4 is a diagram showing the configuration of a state detection system according to a second embodiment.
Figure 5:
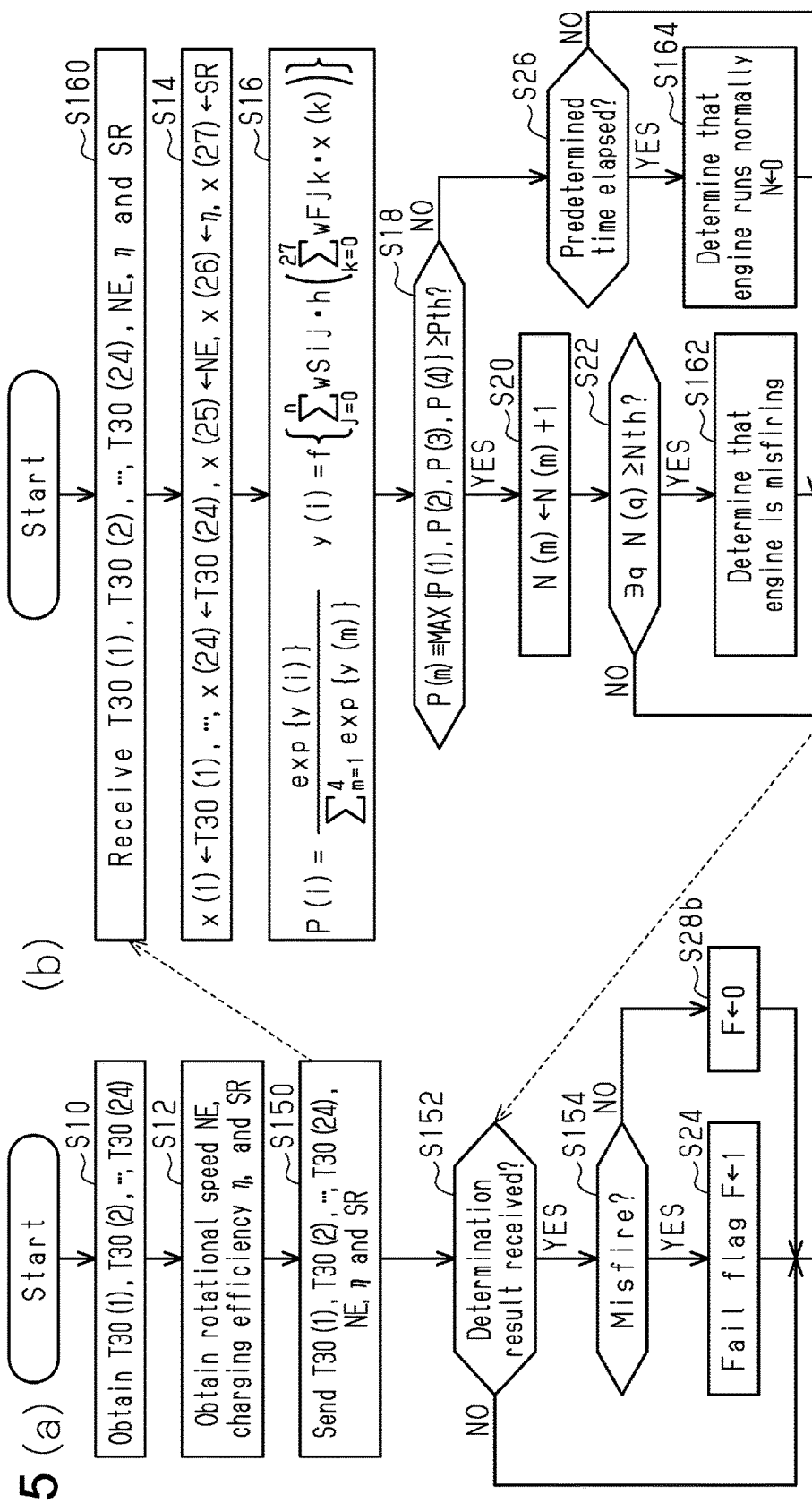
FIG. 5 is a flowchart including section (a) and section (b) and showing the procedure of a process performed by the state detection system of the second embodiment.

Referring to FIGS. 4 and 5, a second embodiment is now described focusing on the differences from the first embodiment. The present embodiment performs determination of misfires outside the vehicle.

FIG. 4 shows a state detection system according to the present embodiment. In FIG. 4, same reference numerals are given to those components that are the same as the corresponding components shown in FIG. 1.

The controller 70 in the vehicle VC shown in FIG. 4 includes a communication device 79. The communication device 79 communicates with a center 120 via a network 110 outside the vehicle VC.

The center 120 analyzes data transmitted from a plurality of vehicles VC. The center 120 includes a CPU 122, a ROM 124, a storage device 126, peripheral circuits 127, and a communication device 129, which can communicate with one another via a local network 128. The ROM 124 stores a main program 124a, and the storage device 126 stores mapping data 126a. The main program 124a of the present embodiment is a misfire detection main program. The mapping data 126a is the same as the mapping data 76a in the first embodiment.

FIG. 5 shows the procedure of a misfire detection process according to the present embodiment. The process shown in section (a) in FIG. 5 is performed by the CPU 72 by executing a sub-program 74c stored in the ROM 74 shown in FIG. 4. The sub-program 74c of the present embodiment is a misfire detection sub-program. The process shown in section (b) in FIG. 5 is performed by the CPU 122 by executing the main program 124a stored in the ROM 124. Same step numbers are given to the steps in FIG. 5 that corresponds to steps shown in FIG. 2. The process shown in FIG. 5 is now described in chronological order of the misfire detection process.

The CPU 72 in the vehicle VC performs step S10 shown in section (a) in FIG. 5. The CPU 72 then obtains the rotational speed NE, the charging efficiency η, and the road surface state variable SR (S12). Step S12a in the misfire detection process of the first embodiment obtains the ignition timing aig, the target value Af*, the EGR ratio Regr, the coolant temperature THW, and the shift position Sft, in addition to the rotational speed NE, the charging efficiency and the road surface state variable SR. In contrast, step S12 of this embodiment obtains the rotational speed NE, the charging efficiency η, and the road surface state variable SR.

The CPU 72 operates the communication device 79 to transmit the data obtained at steps S10 and S12 to the center 120 together with the identification information of the vehicle VC (S150).

As shown in section (b) in FIG. 5, the CPU 122 in the center 120 receives the transmitted data (S160) and repeats the process from S14 to S20 using the received data.

At step S14, the CPU 122 assigns the values obtained at steps S10 and S12 to input variables x(1) to x(27) of the detection mapping for calculating probabilities that misfires have occurred. The CPU 122 assigns minute rotation durations T30(s) to input variables x(s), so that s is 1 to 24. In addition, the CPU 122 assigns the rotational speed NE to the input variable x(25) and assigns the charging efficiency η to the input variable x(26). The CPU 122 assigns the road surface state variable SR to the input variable x(27).

At step S16, the CPU 122 inputs the input variables x(1) to x(27) to the detection mapping defined by mapping data 126a, which is stored in the storage device 126 shown in FIG. 4, to calculate, as combustion state variables, probabilities P(i) that misfires have occurred in cylinders #i (i=1 to 4).

While repeating steps S14 to S20, the CPU 122 determines that misfires are occurring (S162) when determining that the number of misfire events in a certain cylinder has reached a predetermined number Nth within a predetermined time in the same vehicle specified with its identification information (S22: YES). If the number of misfires events does not reach the predetermined number Nth in any cylinder after steps S14 to S20 are repeated over the predetermined time (S26: YES), the CPU 122 determines that the internal combustion engine 10 runs normally and resets the numbers N(1) to N(4) (S164). The predetermined time in this process starts at the time point when step S162 or S164 is performed.

After step S162 or S164, by referring to the identification information, the CPU 122 operates the communication device 129 to send a signal regarding the determination result to the vehicle VC that has sent the data on which the process of S14 to S20 is performed (S166). If it is determined that misfires have occurred, the information on the determination result includes the information on the misfiring cylinder. When completing step S166 or determining that the outcome is negative at step S22 or S26, the CPU 122 ends the sequence of section (b) in FIG. 5.

As shown in section (a) in FIG. 5, when receiving the signal regarding the determination result sent from the center 120 (S152: YES), the CPU 72 in the vehicle VC determines whether the determination result indicates that misfires have occurred (S154). If the determination result indicates that misfires have occurred (S154: YES), the CPU 72 proceeds to step S24. If the determination result indicates that no misfire has occurred (S154: NO), the CPU 72 resets the fail flag F (S28b).

When completing step S24 or S28b or determining that the outcome is negative at step S152, the CPU 72 ends the sequence of section (a) in FIG. 5.

The present embodiment performs the misfire determination process in the center 120, thereby reducing the computation load on the controller 70.

Third Embodiment

Figure 6:
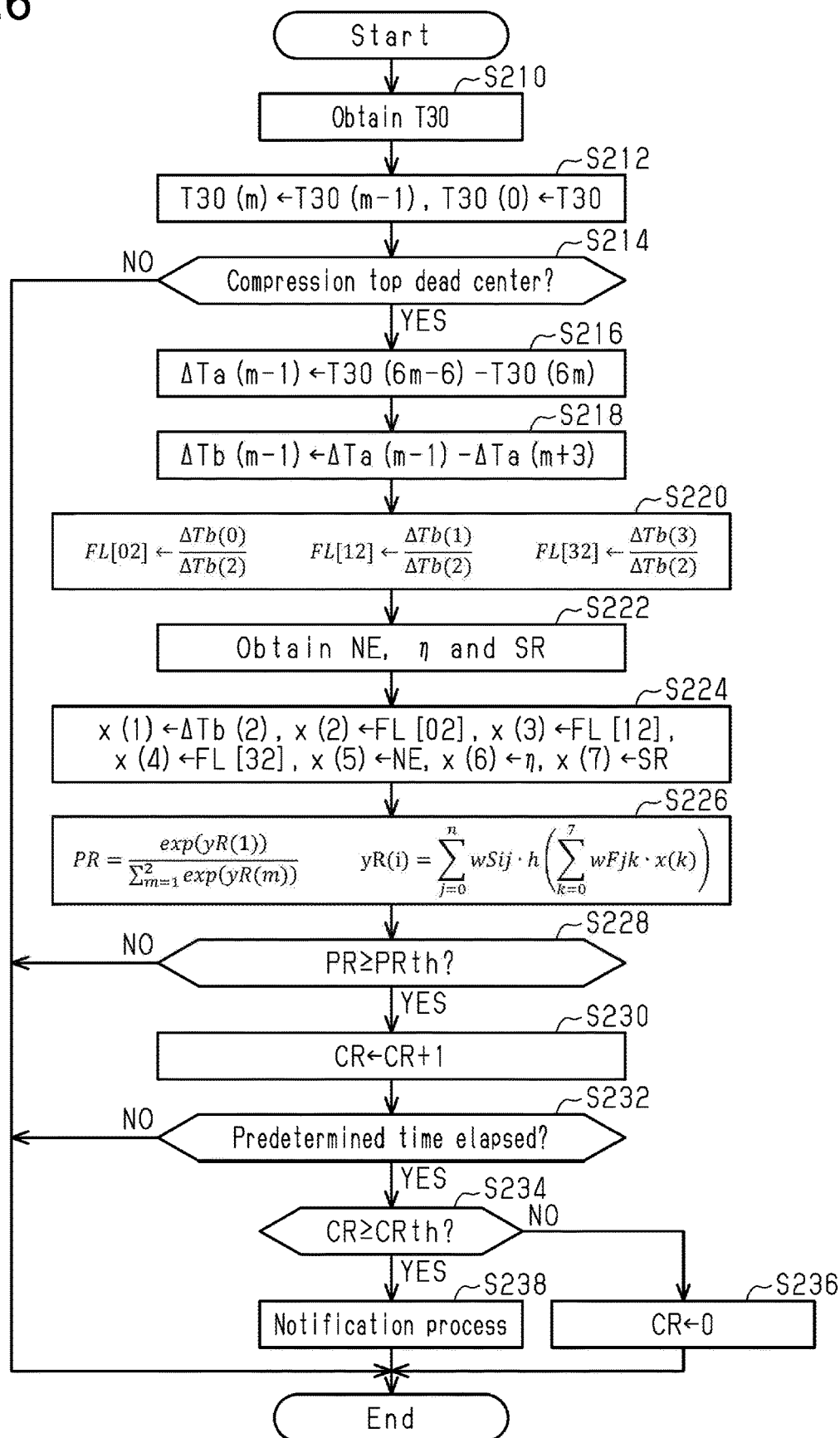
FIG. 6 is a flowchart showing the procedure of a misfire detection process according to a third embodiment.
Figure 7:
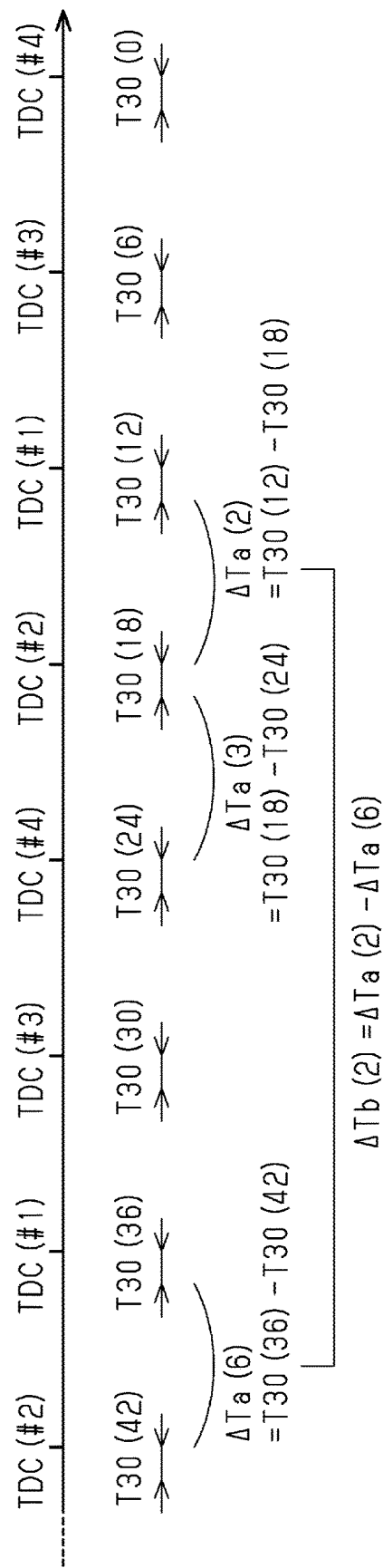
FIG. 7 is a timing chart showing input variables of the mapping according to the third embodiment.

Referring to FIGS. 6 and 7, a third embodiment of a state detection system for an internal combustion engine is now described focusing on the differences from the first embodiment. The state detection system of the present embodiment has the same configuration as the first embodiment except for the contents of the program 74a stored in the ROM 74 and the mapping data 76a stored in the storage device 76.

FIG. 6 shows the procedure of a misfire detection process according to the present embodiment. To perform the process shown in FIG. 6, the CPU 72 may repeatedly execute the misfire detection program, which is the program 74a stored in the ROM 74, in predetermined cycles.

In the process shown in FIG. 6, the CPU 72 first obtains minute rotation durations T30 (S210). Based on the output signal Scr from the crank angle sensor 80, the CPU 72 obtains each minute rotation duration T30 by measuring the time required for the crankshaft 24 to rotate 30° CA. Then, the CPU 72 sets the last minute rotation duration T30 obtained at S210 as the minute rotation duration T30(0), and sets minute rotation durations T30(m) such that an older minute rotation duration T30 has a larger variable m (S212). That is, when m=1, 2, 3, ..., the minute rotation duration T30(m−1) obtained immediately before step S212 is set as the current minute rotation duration T30(m). As such, the duration that was set as T30(0) in the previous process becomes T30(1) in the current process, and the duration that was set as T30(1) in the previous process becomes T30(2). Accordingly, the minute rotation duration T30 obtained at step S210 in the previous process of FIG. 6 becomes the minute rotation duration T30(1).

Then, the CPU 72 determines whether the minute rotation duration T30 obtained at step S210 is the time required to rotate by the angular interval from 30° CA before a compression top dead center position of any of cylinders #1 to #4 to this compression top dead center position (S214). When determining that the minute rotation duration T30 is the time required to rotate by the angular interval from 30° CA before a compression top dead center position to this compression top dead center position (S214: YES), the CPU 72 then determines the presence or absence of a misfire in the cylinder that has reached compression top dead center 360° CA before the last compression top dead center position. To this end, the CPU 72 first calculates values of rotation waveform variables, which are input to the process of determining the presence or absence of misfires.

First, the CPU 72 obtains a cylinder-to-cylinder variable ΔTa, which is the difference between minute rotation durations T30 that are separated from each other by 180° CA (S216). Each of these minute rotation durations T30 is associated with an angular interval from 30° CA before a compression top dead center position to this compression top dead center position. Specifically, the CPU 72 obtains a cylinder-to-cylinder variable ΔTa(m−1) by T30(6 m−6)−T30(6 m) where m=1, 2, 3, ....

FIG. 7 shows an example of cylinder-to-cylinder variables ΔTa. In the present embodiment, the cylinders reach compression top dead center and produce combustion strokes in the order of cylinder #1, cylinder #3, cylinder #4, and cylinder #2. In the example of FIG. 7, at S210, the minute rotation duration T30(0) is obtained for the angular interval from 30° CA before a compression top dead center position of cylinder #4 to this compression top dead center position. The target of misfire detection in this example is cylinder #1. That is, in the example of FIG. 7, the minute rotation duration T30(0) is associated with a compression top dead center position of cylinder #4, and the minute rotation duration T30(6) is associated with the compression top dead center position of cylinder #3 that occurs immediately before the compression top dead center position of cylinder #4. The minute rotation duration T30(12) is associated with the compression top dead center position of cylinder #1 that occurs two positions before the compression top dead center positions of cylinder #4, and the minute rotation duration T30(18) is associated with the compression top dead center position of cylinder #2 that occurs three positions before the compression top dead center position of cylinder #4. Further, the minute rotation duration T30(24) is associated with the compression top dead center position of cylinder #4 that occurs four positions before the compression top dead center position of cylinder #4 associated with the minute rotation duration T30(0). In this case, the cylinder-to-cylinder variable ΔTa(3) is the difference between the minute rotation duration T30 associated with compression top dead center of cylinder #2 and the minute rotation duration T30 associated with compression top dead center of cylinder #4, which reaches compression top dead center immediately before cylinder #2. The cylinder-to-cylinder variable ΔTa(0) is the difference between the minute rotation duration T30 associated with compression top dead center of cylinder #4 and the minute rotation duration T30 associated with compression top dead center of cylinder #3, which reaches compression top dead center immediately before cylinder #4. FIG. 7 shows that the cylinder-to-cylinder variable ΔTa(2) is the difference between the minute rotation duration T30(12) associated with compression top dead center of the cylinder #1, which is the target of misfire detection, and the minute rotation duration T30(18) associated with compression top dead center of cylinder #2.

Referring again to FIG. 6, the CPU 72 then calculates a cylinder-to-cylinder variable ΔTb, which is the difference between the values of cylinder-to-cylinder variables ΔTa that are separated from each other by 720° CA among cylinder-to-cylinder variables ΔTa(0), ΔTa(1), ΔTa(2), ... (S218). Specifically, the CPU 72 obtains the cylinder-to-cylinder variable ΔTb(m−1) by ΔTa(m−1)−ΔTa(m+3) where m=1, 2, 3, ....

FIG. 7 shows an example of cylinder-to-cylinder variable ΔTb. FIG. 7 shows that the cylinder-to-cylinder variable ΔTb(2) is given by ΔTa(2)−ΔTa(6).

Then, the CPU 72 calculates a fluctuation pattern variable FL, which represents the relationship between the magnitude of the cylinder-to-cylinder variable ΔTb associated with the cylinder that is the target of misfire detection and the magnitude of the cylinder-to-cylinder variable ΔTb associated with another cylinder (S220). The present embodiment obtains fluctuation pattern variables FL[02], FL[12] and FL[32].

The fluctuation pattern variable FL[02] is defined by ΔTb(0)/ΔTb(2). In the example shown in FIG. 7, the fluctuation pattern variable FL[02] is a value obtained by dividing the cylinder-to-cylinder variable ΔTb(0) associated with cylinder #4 by the cylinder-to-cylinder variable ΔTb(2) associated with cylinder #1, which is the target of misfire detection. Cylinder #4 reaches compression top dead center one cylinder after cylinder #1. The fluctuation pattern variable FL[12] is defined by ΔTb(1)/ΔTb(2). That is, in the example of FIG. 7, the fluctuation pattern variable FL[12] is a value obtained by dividing the cylinder-to-cylinder variable ΔTb(1) associated with cylinder #3 by the cylinder-to-cylinder variable ΔTb(2) associated with cylinder #1, which is the target of misfire detection. Cylinder #3 reaches compression top dead center immediately after cylinder #1. The fluctuation pattern variable FL[32] is defined by ΔTb(3)/ΔTb(2). That is, in the example of FIG. 7, the fluctuation pattern variable FL[32] is a value obtained by dividing the cylinder-to-cylinder variable ΔTb(3) associated with cylinder #2 by the cylinder-to-cylinder variable ΔTb(2) associated with cylinder #1, which is the target of misfire detection. Cylinder #2 reaches compression top dead center immediately before cylinder #1. In the present embodiment, these ΔTb(2), FL[02], FL[12] and FL[32] correspond to rotation waveform variables.

Then, the CPU 72 obtains the rotational speed NE, the charging efficiency η, and the road surface state variable SR in the same manner as the first embodiment (S222).

The CPU 72 then assigns the values of the rotation waveform variables obtained at steps S218 and S220 and the values of variables obtained at step S222 to the input variables x(1) to x(7) of the detection mapping, which outputs a misfire variable PR (S224). The misfire variable PR relates to the probability that a misfire has occurred in the cylinder that is the target of detection. The CPU 72 assigns the cylinder-to-cylinder variable ΔTb(2) to the input variable x(1), the fluctuation pattern variable FL[02] to the input variable x(2), the fluctuation pattern variable FL[12] to the input variable x(3), and the fluctuation pattern variable FL[32] to the input variable x(4). The CPU 72 also assigns the rotational speed NE to the input variable x(5), the charging efficiency η to the input variable x(6), and the road surface state variable SR to the input variable x(7).

The CPU 72 then inputs the input variables x(1) to x(7) to the detection mapping defined by the mapping data 76a, which is stored in the storage device 76 shown in FIG. 1, to calculate a value of the misfire variable PR, which is the output value of the detection mapping (S226). That is, the present embodiment calculates the misfire variable PR as the combustion state variable.

The present embodiment uses the detection mapping, which includes a neural network having one intermediate layer. The neural network includes input-side coefficients wFjk (j=0 to n, k=0 to 7) and activation functions h(x). The input-side coefficients wFjk define input-side linear mappings, and the activation functions h(x) are input-side nonlinear mappings that perform nonlinear transformation on the output of the respective input-side linear mappings. In the present embodiment, ReLU is used as the activation function h(x). ReLU is a function that outputs the lesser of the input and 0. Input-side coefficients wFj0 are bias parameters, and input variable x(0) is defined as 1.

The neural network also includes the softmax function, which takes as inputs original variables yR(1) and yR(2) to output the misfire variable PR. The original variables yR(1) and yR(2) are outputs of the output-side linear mappings, which are defined by output-side coefficients wSij (i=1 to 2, j=0 to n). In the present embodiment, the misfire variable PR is a quantified representation of the level of likelihood that a misfire has actually occurred. The misfire variable PR can take a continuous value in the predetermined range that is greater than 0 and less than 1.

Then, the CPU 72 determines whether the value of the misfire variable PR is greater than or equal to a determination value PRth (S228). When determining that the value of the misfire variable PR is greater than or equal to the determination value PRth (S228: YES), the CPU 72 increments a counter CR (S230). The CPU 72 then determines whether a predetermined time has elapsed since the time point when step S228 was first performed or when step S236, which will be described below, was performed (S232). This predetermined time is longer than the duration of one combustion cycle, and preferably ten times longer than one combustion cycle or longer.

When determining that the predetermined time has elapsed since the time point described above (S232: YES), the CPU 72 then determines whether the counter CR is greater than or equal to a threshold value CRth (S234). This step determines whether misfires have occurred at a frequency exceeding the permissible level. When determining that the counter CR is less than the threshold value CRth (S234: NO), the CPU 72 resets the counter CR (S236). When determining that the counter CR is greater than or equal to the threshold value CRth (S234: YES), the CPU 72 performs a notification process that operates the warning light 90 shown in FIG. 1 to prompt the user to respond to the problem (S238).

The CPU 72 ends the sequence shown in FIG. 6 when step S236 or S238 is completed or when the outcome is negative at step S214, S228 or S232.

The mapping data 76a of the present embodiment is learned in the same manner as the mapping data 76a of the first embodiment. That is, the internal combustion engine 10 is operated with the crankshaft 24 connected to a dynamometer in a test bench to learn the mapping data 76a.

The operation and advantages of the present embodiment will now be described.

The CPU 72 determines the presence or absence of a misfire by calculating a value of the misfire variable PR based on the rotation waveform variables. The same advantages as the first embodiment are therefore achieved.

The third embodiment further has the following operational advantages.

(3) The rotation waveform variables (ΔTb(2), FL[02], FL[12] and FL[32]) used as input variables x are generated based on the minute rotation durations T30 near or at compression top dead center positions that are selected from a large number of minute rotation durations T30. The values of the minute rotation durations T30 near or at compression top dead center positions change significantly depending on the presence or absence of a misfire, as compared to other minute rotation durations T30. The use of values of selected minute rotation durations T30 near or at compression top dead center positions reduces the number of dimensions of the input variables x, without compromising the information required to determine the presence or absence of a misfire.

(4) The rotation waveform variables include the cylinder-to-cylinder variable ΔTb(2). The difference between the cylinder that is the target of misfire detection and an adjacent cylinder in minute rotation durations T30 near or at compression top dead center positions is quantified into a single cylinder-to-cylinder variable ΔTb (2). This allows the information required to determine the presence or absence of a misfire to be incorporated efficiently using variables of limited number of dimensions.

(5) The rotation waveform variables include not only the cylinder-to-cylinder variable ΔTb(2) but also the fluctuation pattern variables FL. Vibration from the road surface or other factors is superposed on the rotation of the crankshaft 24. For this reason, the determination can be erroneous if the rotation waveform variables include only the cylinder-to-cylinder variable ΔTb(2). In this respect, the present embodiment calculates the misfire variable PR using the fluctuation pattern variables FL in addition to the cylinder-to-cylinder variable ΔTb(2). Consequently, the calculated value of the misfire variable PR accurately represents the level of likelihood, or probability, that a misfire has occurred, as compared to a configuration that calculates the misfire variable PR using only the cylinder-to-cylinder variable ΔTb(2), for example.

Furthermore, the present embodiment calculates a value of misfire variable PR by computing a combination of the cylinder-to-cylinder variable ΔTb(2) and the fluctuation pattern variables FL using the input-side coefficients wFjk, which are parameters learned by machine learning. Thus, as compared to a configuration that determines the presence or absence of a misfire based on the comparison between the cylinder-to-cylinder variable ΔTb(2) and the determination value and the comparison between the fluctuation pattern variable FL and the determination value, the present embodiment determines the presence or absence of a misfire based on more detailed relationship between a misfire and values of cylinder-to-cylinder variable ΔTb(2) and fluctuation pattern variables FL.

Fourth Embodiment

Figure 8:
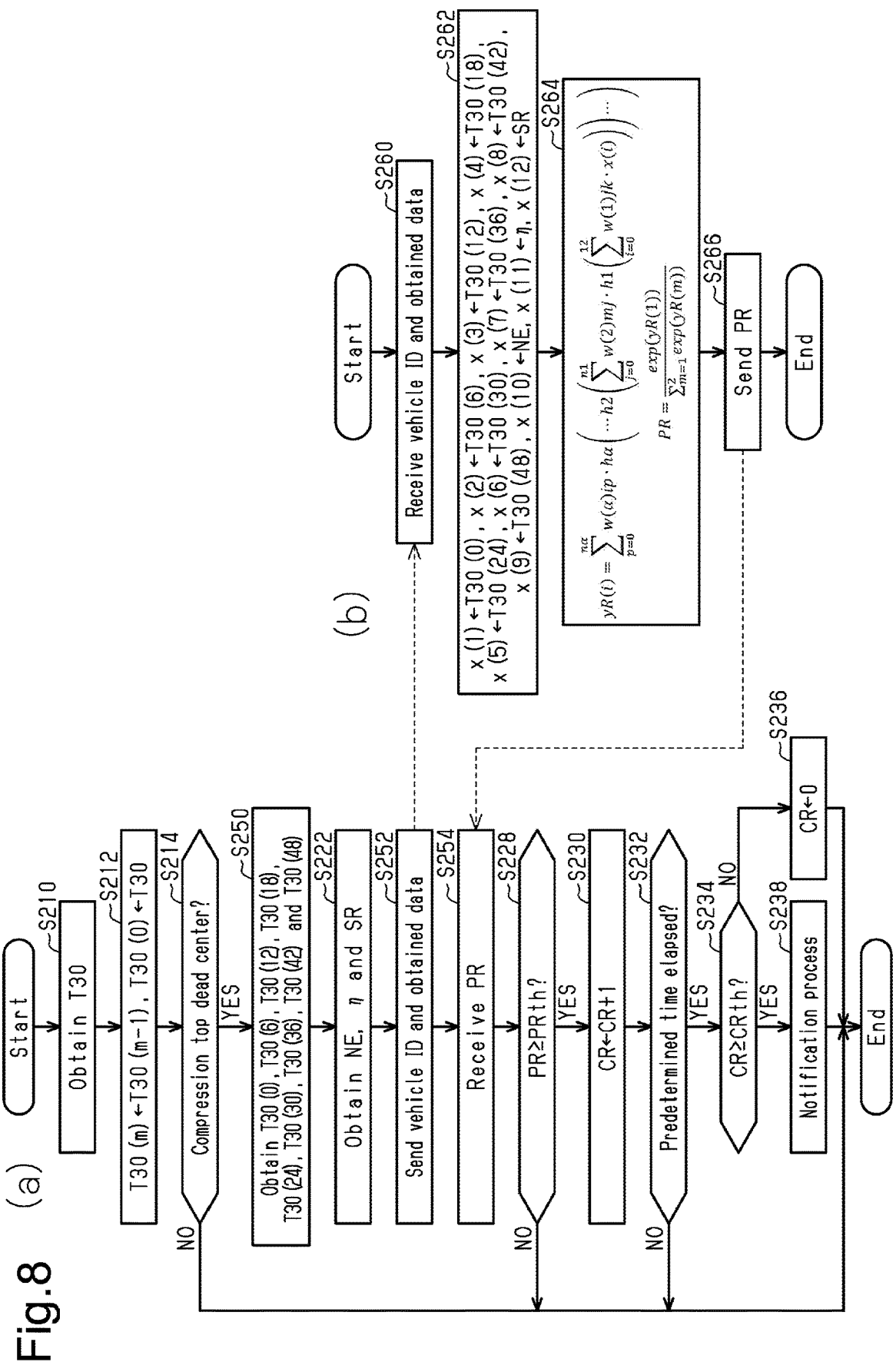
FIG. 8 is a flowchart including section (a) and section (b) and showing the procedure of a process performed by a state detection system of a fourth embodiment.

Referring to FIG. 8, a fourth embodiment is now described focusing on the differences from the third embodiment. The present embodiment performs calculation of the misfire variable PR outside the vehicle.

The state detection system of the present embodiment has the same configuration as the second embodiment shown in FIG. 4 except for the contents of the sub-program 74c stored in the ROM 74, the main program 124a stored in the ROM 124, and the mapping data 126a stored in the storage device 126. Same reference numerals are given to those components that are the same as the corresponding components of the second embodiment.

FIG. 8 shows the procedure of a misfire detection process according to the present embodiment. The process shown in section (a) in FIG. 8 is performed by the CPU 72 by executing the sub-program 74c stored in the ROM 74 shown in FIG. 4. Although the contents are different from those of the second embodiment, the sub-program 74c of this embodiment is also a misfire detection sub-program for detecting misfires. The process shown in section (b) in FIG. 8 is performed by the CPU 122 by executing the main program 124a stored in the ROM 124. Although the contents are different from those of the second embodiment, the main program 124a of this embodiment is also a misfire detection main program for detecting misfires. Same step numbers are given to the steps in FIG. 8 that correspond to steps shown in FIG. 6. The process shown in FIG. 8 is now described in chronological order of the misfire detection process.

When determining that the outcome is affirmative at S214 in section (a) of FIG. 8, the CPU 72 in the vehicle VC obtains minute rotation durations T30(0), T30(6), T30(12), T30(18), T30(24), T30(30), T30(36), T30(42) and T30(48) (S250). These minute rotation durations T30 form rotation waveform variables, which include information on the differences between minute rotation durations T30 associated with mutually different angular intervals. In particular, these minute rotation durations T30 each represent the time required to rotate by an angular interval from 30° CA before a compression top dead center position to this compression top dead center position. These nine durations T30(0) to T30(48) are associated with nine compression top dead center positions. As such, the dataset of minute rotation durations T30 serves as variables that represent information on the differences between the minute rotation durations T30 associated with mutually different compression top dead center positions. The nine minute rotation durations T30 are all used to calculate the cylinder-to-cylinder variable $\Delta Tb(2)$ and the fluctuation pattern variables FL[02], FL[12] and FL[32] (see FIG. 7).

After step S222, the CPU 72 operates the communication device 79 to transmit the data obtained at steps S250 and S222 to the center 120 together with the identification information (the vehicle ID) of the vehicle VC (S252).

As shown in section (b) in FIG. 8, the CPU 122 in the center 120 receives the data transmitted by the vehicle VC (S260). The CPU 122 then assigns the values of the variables obtained at step S260 to the input variables x(1) to x(12) (S262). That is, the CPU 122 assigns the minute rotation duration T30(0) to the input variable x(1), the minute rotation duration T30(6) to the input variable x(2), the minute rotation duration T30(12) to the input variable x(3), and the minute rotation duration T30(18) to the input variable x(4). The CPU 122 assigns the minute rotation duration T30(24) to the input variable x(5), the minute rotation duration T30(30) to the input variable x(6), the minute rotation duration T30(36) to the input variable x(7), the minute rotation duration T30(42) to the input variable x(8), and the minute rotation duration T30(48) to the input variable x(9). The CPU 122 also assigns the rotational speed NE to the input variable x(10), the charging efficiency η to the input variable x(11), and the road surface state variable SR to the input variable x(12).

The CPU 122 then inputs the input variables x(1) to x(12) to the detection mapping defined by the mapping data 126a, which is stored in the storage device 126 shown in FIG. 4, to calculate a value of misfire variable PR, which is the output value of the detection mapping (S264).

The present embodiment uses the detection mapping, which includes a neural network having intermediate layers, the number of which is represented by α. The activation functions h1 to hα in each intermediate layer are ReLU, and the activation function in the output layer of the neural network is the softmax function. For example, the input variables x(1) to x(12) are input to linear mappings defined by coefficients w(1)ji (j=0 to n1, i=0 to 12). The outputs of the linear mappings are input to the activation functions h1, so that the values of the nodes in the first intermediate layer are obtained. That is, when m=1, 2, . . . , α, the values of the nodes in the m-th intermediate layer are obtained by inputting the outputs of the linear mappings defined by coefficients w(m) to the activation functions hm. In FIG. 8, n1, n2, . . . , nα are the numbers of nodes in the first, second, . . . , αth intermediate layers, respectively. Input-side coefficients w(1)j0 are bias parameters, and input variable x(0) is defined as 1.

Then, the CPU 122 operates the communication device 129 to send a signal that indicates the value of the misfire variable PR to the vehicle VC that has sent the data received at step S260 (S266), and ends the sequence shown in section (b) of FIG. 8. As shown in section (a) of FIG. 8, the CPU 72 receives the value of the misfire variable PR (S254) and performs steps S228 to S238.

The present embodiment performs step S264 in the center 120, thereby reducing the computation load on the CPU 72.

Fifth Embodiment

Figure 9:
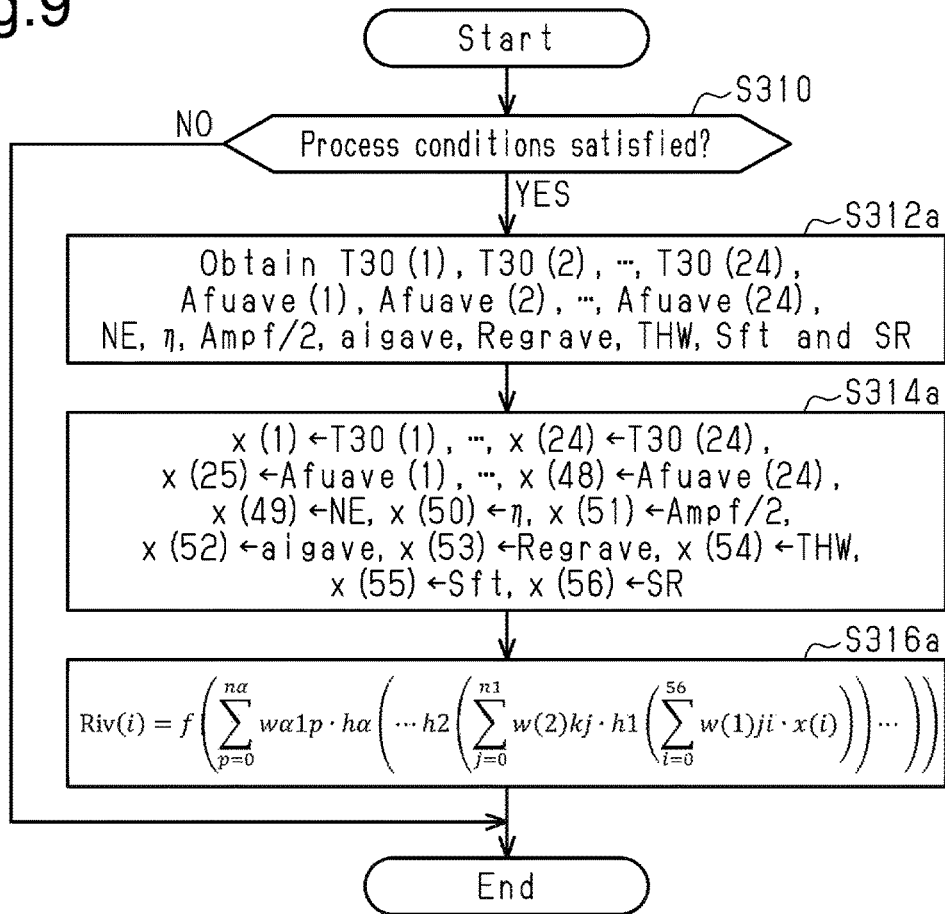
FIG. 9 is a flowchart showing the procedure of an imbalance detection process according to a fifth embodiment.
Figure 10:
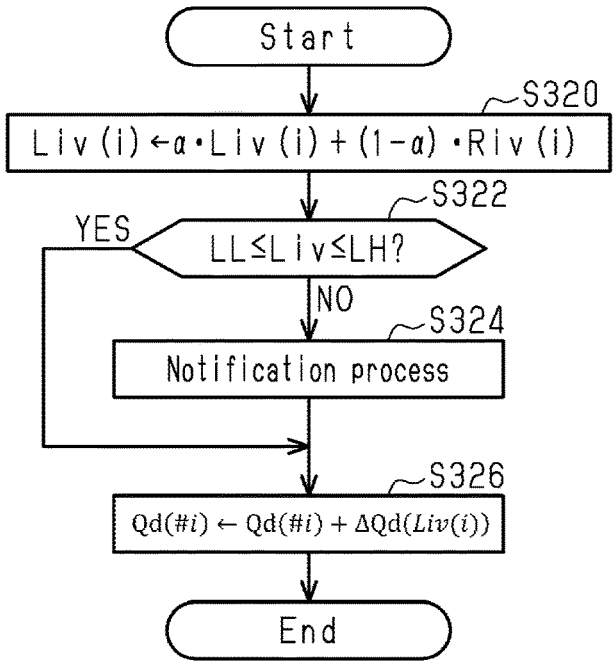
FIG. 10 is a flowchart showing the procedure of a process of responding to an imbalance according to the fifth embodiment.

Referring to FIGS. 9 and 10, a fifth embodiment is now described focusing on the differences from the embodiments described above.

The state detection systems of the embodiments described above detect misfires in the internal combustion engine 10 based on the fluctuation in the rotation of the crankshaft 24. The fluctuation in the rotation of the crankshaft 24 is increased when there is an imbalance, or variations, in air-fuel ratio among cylinders causing variations in combustion state among the cylinders. The state detection system of the present embodiment is configured to detect such imbalance in air-fuel ratio among cylinders. The configuration of the state detection system according to the present embodiment is generally the same as the configuration shown in FIG. 1. However, the ROM 74 of the state detection system of this embodiment stores a program for detecting an imbalance in air-fuel ratio among cylinders as the program 74a, instead of the misfire detection program.

FIG. 9 shows the procedure of an imbalance detection process according to the present embodiment. To perform the process shown in FIG. 9, the CPU 72 repeatedly executes the imbalance detection program, which is the program 74a stored in the ROM 74, in predetermined control cycles.

In the process shown in FIG. 9, the CPU 72 first determines whether the conditions for performing the imbalance detection process are satisfied (S310). The conditions include that the internal combustion engine 10 is not performing purging of fuel vapors into the intake air or recirculation of the exhaust gas.

At S312a, the CPU 72 obtains minute rotation durations T30(1), T30(2), . . . , T30(24), upstream-side average values Afuave(1), Afuave(2), Afuave(24), rotational speed NE, the charging efficiency η, and a half order amplitude Ampf/2. Ampf/2 is the symbol for the half order amplitude. Based on the output signal Scr from the crank angle sensor 80, the CPU 72 obtains a minute rotation duration T30 by measuring the time required for the crankshaft 24 to rotate 30° CA. Different numbers in parentheses, such as in minute rotation durations T30(1) and T30(2), represent different rotational angular intervals within the range of 720° CA corresponding to one combustion cycle. That is, the 720° CA rotational angle range is divided into equal 30° CA angular intervals, and minute rotation durations T30(1) to T30(24) correspond to respective intervals.

Specifically, based on the output signal Scr, the CPU 72 measures the time required for the crankshaft 24 to rotate 30° CA, and sets this time as an unfiltered duration NF30. Then, the CPU 72 obtains filtered durations AF30 by applying a digital filter to unfiltered durations NF30. The CPU 72 then obtains the minute rotation durations T30 by normalizing the filtered durations AF30 such that the difference between the local maximum (maximum value) and the local minimum (minimum value) of the filtered durations AF30 measured in a predetermined period (e.g., 720° CA) is 1.

When m=1 to 24, the upstream-side average value Afuave (m) is the average value of the upstream detection values Afu in the 30° CA angular interval for which the minute rotation duration T30($m$) is obtained. The half order amplitude Ampf/2 is the magnitude of the half order component of the rotation frequency of the crankshaft 24. The CPU 72 calculates the half order amplitude Ampf/2 by performing the Fourier transformation on the time series data of minute rotation durations T30.

At S312a, the CPU 72 also obtains the ignition timing average value aigave, the EGR ratio average value Regrave, the coolant temperature THW, the shift position Sft, and the road surface state variable SR. The ignition timing average value aigave and the EGR ratio average value Regrave are the average values of the ignition timings aig and the EGR ratios Regr obtained during the cycle of the process of FIG. 9. The road surface state variable SR is obtained in the same manner as the first embodiment.

Then, the CPU 72 assigns the values obtained at step S312a to the input variables x(1) to x(56) of the detection mapping that outputs imbalance ratios Riv (S314a). Specifically, for m=1 to 24, the CPU 72 assigns the value of the minute rotation duration T30($m$) to the input variable x(m), and assigns the value of the upstream-side average value Afuave(m) to the input variable x(24+m). In addition, the CPU 72 assigns the value of rotational speed NE to the input variable x(49), the value of charging efficiency η to the input variable x(50), and the value of half order amplitude Ampf/2 to the input variable x(51). The CPU 72 also assigns the value of ignition timing average value aigave to the input variable x(52), the value of EGR ratio average value Regrave to the input variable x(53), the value of coolant temperature THW to the input variable x(54), the value of shift position Sft to the input variable x(55), and the value of the road surface state variable SR to the input variable x(56).

In the present embodiment, the imbalance ratio Riv of a cylinder is set to 0 when the intended amount of fuel is injected in the cylinder. The ratio is set to a positive value if the actual injection amount is greater than the intended amount, and the ratio is set to a negative value if the actual injection amount is less than the intended amount. That is, the imbalance ratios Riv serve as imbalance variables, which represent a level of variations in the actual air-fuel ratios that occur under the condition where the fuel injection valves 20 are operated to control the cylinders #1 to #4 to have a uniform air-fuel ratio of the mixture.

Then, the CPU 72 inputs the values of the input variables x(1) to x(56) to the detection mapping, which is defined by the mapping data 76a stored in the storage device 76 shown in FIG. 1, to calculate values of imbalance ratios Riv(1) to Riv(4) of the respective cylinders #i (i=1 to 4) (S316a)

The present embodiment uses the detection mapping, which includes a neural network having one intermediate layer. The neural network includes input-side coefficients wFjk (j=0 to n, k=0 to 56) and activation functions h(x). The input-side coefficients wFjk define input-side linear mappings, and the activation functions h(x) are input-side non-linear mappings that perform nonlinear transformation on the output of the respective input-side linear mappings. In the present embodiment, the hyperbolic tangent tan h(x) is used as the activation function h(x). The neural network also includes output-side coefficients wSij (i=1 to 4, j=0 to n) and activation functions f(x). The output-side coefficients wSij define output-side linear mappings, and the activation functions f(x) are output-side nonlinear mappings that perform nonlinear transformation on the output of the respective output-side linear mappings. In the present embodiment, the hyperbolic tangent tan h(x) is used as the activation function f(x). The value n indicates the number of dimensions in the intermediate layer.

The CPU 72 ends the sequence shown in FIG. 9 when step S316a is completed or when the outcome is negative at step S310.

FIG. 10 shows the procedure of a process that uses the imbalance ratios Riv(i). To perform the process shown in FIG. 10, the CPU 72 may repeatedly execute a program stored in the ROM 74, which is shown in FIG. 1, each time the imbalance ratios Riv are calculated.

In the process shown in FIG. 10, the CPU 72 first updates the imbalance learned values Liv(i) by an exponential moving average that uses as inputs the latest values of the imbalance ratios Riv(i) obtained in the process of FIG. 9 (S320). Specifically, the CPU 72 updates each imbalance learned value Liv(i) to the sum of the value obtained by multiplying the imbalance learned value Liv(i) stored in the storage device 76 by a coefficient α and the value obtained by multiplying the imbalance ratio Riv(i) by 1−α (S320). The coefficient α is set as 0<α<1.

Then, the CPU 72 determines whether the imbalance learned value Liv(i) is greater than or equal to a permissible lean limit LL and is less than or equal to a permissible rich limit LH (S322). When determining that the imbalance learned value Liv(i) is less than the permissible lean limit LL or greater than the permissible rich limit (S322: NO), the CPU 72 performs the notification process by operating the warning light 90 to prompt the user to repair the internal combustion engine 10, for example (S324).

When determining that the imbalance learned value Liv(i) is greater than or equal to the permissible lean limit LL and is less than or equal to the permissible rich limit LH (S322: YES), or completing step S324, the CPU 72 corrects the required injection amount Qd(#i) of the cylinder (S326). That is, the CPU 72 adds a correction amount ΔQd(Liv(i)), which is obtained according to the imbalance learned value Liv(i), to the required injection amount Qd(#i) of the cylinder, thereby correcting the required injection amount Qd(#i). The correction amount ΔQd(Liv(i)) is a negative value when the imbalance learned value Liv(i) is larger than zero, and is a positive value when the imbalance learned value Liv(i) is smaller than zero. When the imbalance learned value Liv(i) is zero, the correction amount ΔQd(Liv(i)) is also zero.

After step S326, the CPU 72 ends the process shown in FIG. 10. In the present embodiment, when determining that the outcome at step S310 is affirmative and proceeding to step S312a, the CPU 72 halts step S326.

The mapping data 76a of the present embodiment may be generated as follows.

First, by measuring fuel injection valves 20 individually, a plurality of fuel injection valves 20 that have different imbalance ratios other than zero, and three fuel injection valves 20 each having an imbalance ratio of zero are prepared. Then, a torque converter 60 is coupled to an internal combustion engine 10, on which the three fuel injection valves 20 having an imbalance ratio of zero and one fuel injection valve 20 having an imbalance ratio other than zero are mounted. The internal combustion engine 10 is operated with a dynamometer connected to the output shaft of the torque converter 60 in a test bench. The imbalance ratios Rivt of the fuel injection valves 20 mounted on the internal combustion engine 10 are used as training data of the supervised learning. The imbalance ratios that serve as training data of the supervised learning have the symbol Rivt, which is obtained by adding t to Riv.

Then, values of the imbalance ratios Riv are calculated in the same manner as steps S314a and S316a using the values of each rotation waveform variable and the variables corresponding to the variables to be obtained at step S312a. The values of the input-side coefficients wFjk and output-side coefficients wSij are learned such that the differences between the calculated imbalance ratios Riv and the imbalance ratios Rivt in the training data of the supervised learning are minimized. Specifically, the values of the input-side coefficients wFjk and output-side coefficients wSij are learned such that the cross entropy is minimized.

The present embodiment includes the road surface state variable SR in the inputs to the detection mapping. The imbalance ratios are thus calculated by taking account of the effects of the state of the road surface on which the vehicle VC is traveling. This increases the accuracy in detecting an imbalance in air-fuel ratio among cylinders in the internal combustion engine 10 mounted on the vehicle VC.

The present embodiment described above further has the following advantages.

(1) The rotational speed NE and the charging efficiency η, which are operating point variables that define the operating point of the internal combustion engine 10, are used as inputs to the detection mapping. The operating amounts of the operation portions of the internal combustion engine 10, such as the ignition devices 22, the EGR valve 34, and the intake variable valve timing system 40, often depend on the operating point of the internal combustion engine 10. As such, the operating point variables include information on the operating amounts of the operation portions. Inputting the operating point variables to the detection mapping allows the imbalance ratios Riv(i) to be calculated using the information on the operating amounts of the operation portions. This increases the accuracy of the calculated imbalance ratios Riv(i).

(2) The upstream-side average values Afuave are included in the inputs to the detection mapping. Consequently, unlike a configuration that uses the upstream detection value Afu for each time interval of the time series data, the present embodiment obtains more accurate information on the oxygen flowing into the catalyst 30 and the unburned fuel, without increasing the amount of time series data. The accuracy of calculated imbalance ratios Riv(i) is thus increased.

Sixth Embodiment

Figure 11:
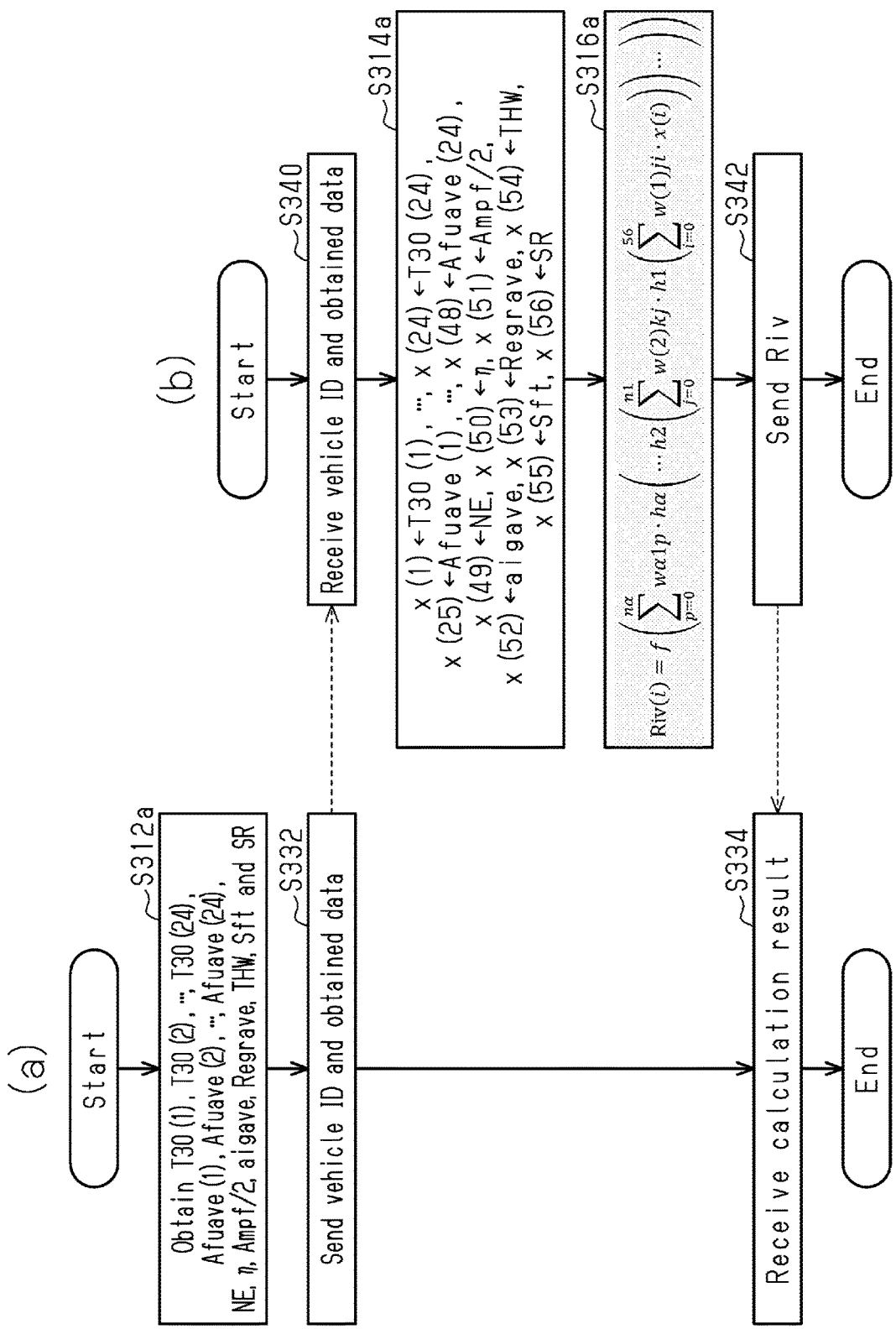
FIG. 11 is a flowchart including section (a) and section (b) and showing the procedure of a process performed by a state detection system of a sixth embodiment.

Referring to FIG. 11, a sixth embodiment is now described focusing on the differences from the fifth embodiment. The present embodiment performs the calculation of imbalance ratios Riv(i) outside the vehicle.

The state detection system of the present embodiment has the same configuration as the second embodiment shown in FIG. 4 except for the contents of the sub-program 74c stored in the ROM 74, the main program 124a stored in the ROM 124, and the mapping data 126a stored in the storage device 126. Same reference numerals are given to those components that are the same as the corresponding components of the second embodiment.

FIG. 11 shows the procedure of an imbalance detection process according to the present embodiment. The process shown in section (a) in FIG. 11 is performed by the CPU 72 by executing the sub-program 74c stored in the ROM 74 shown in FIG. 4. The sub-program 74c of the present embodiment serves as an imbalance detection sub-program used to detect an imbalance. The process shown in section (b) in FIG. 11 is performed by the CPU 122 by executing the main program 124a stored in the ROM 124. The main program 124a of the present embodiment serves as an imbalance detection main program used to detect an imbalance. Same step numbers are given to the steps in FIG. 11 that correspond to steps shown in FIG. 9. The process shown in FIG. 11 is now described in chronological order of the imbalance detection process.

As shown in section (a) in FIG. 11, after performing step S312a, the CPU 72 in the vehicle VC operates the communication device 79 to transmit the data obtained at step S312a to the center 120 together with the vehicle ID, which is the identification information of the vehicle VC (S332).

As shown in section (b) in FIG. 11, the CPU 122 in the center 120 receives the transmitted data (S340) and performs steps S314a and S316a. Then, the CPU 122 operates the communication device 129 to send a signal regarding the imbalance ratios Riv(i) to the vehicle VC that has sent the data received at step S340 (S342), and ends the sequence shown in section (b) of FIG. 11. As shown in section (a) of FIG. 11, the CPU 72 receives the signal regarding the imbalance ratios Riv(i) (S334), and ends the process of section (a) of FIG. 11.

The present embodiment calculates the imbalance ratios Riv(i) in the center 120. This reduces the computation load on the CPU 72.

Correspondence

The correspondences between the features in the embodiments described above and the features described in the SUMMARY are as follows.

The storage device corresponds to the storage device 76. In the first embodiment shown in FIGS. 1 to 3, the second embodiment shown in FIGS. 4 and 5, the fifth embodiment shown in FIGS. 9 and 10, and the sixth embodiment shown in FIG. 11, the minute rotation durations T30(1) to T30(24) correspond to rotation waveform variables. Further, in the third embodiment shown in FIGS. 6 and 7 and the fourth embodiment shown in FIG. 8, the cylinder-to-cylinder variable ΔTb(2) and the fluctuation pattern variables FL[02], FL[12] and FL[32] correspond to rotation waveform variables.

The first execution device corresponds to the CPU 72 and the ROM 74. The second execution device corresponds to the CPU 122 and the ROM 124. The obtainment process corresponds to steps S10, S12a, S12, S218, S222, S250 and S312a.

The output value calculation process corresponds to steps S16a, S16, S226, S264 and S316a. The external transmission process corresponds to steps S166, S266 and S342. The vehicle-side reception process corresponds to steps S152, S254 and S334.

The determination process corresponds to steps S18, S20, S22, S24, S162, S228, S230, S232, S234 and S322. The data analysis device corresponds to the center 120.

In the first embodiment shown in FIGS. 1 to 3 and the second embodiment shown in FIGS. 4 and 5, the probability P(i) that a misfire has occurred corresponds to the combustion state variable. In the third embodiment shown in FIGS. 6 and 7 and the fourth embodiment shown in FIG. 8, the misfire variable PR corresponds to the combustion state variable. In the fifth embodiment shown in FIGS. 9 and 10 and the sixth embodiment shown in FIG. 11, the imbalance ratio Riv(i) corresponds to the combustion state variable.

Further, in the first embodiment shown in FIGS. 1 to 3, the second embodiment shown in FIGS. 4 and 5, the third embodiment shown in FIGS. 6 and 7, and the fourth embodiment shown in FIG. 8, a state in which a misfire has occurred corresponds to the predetermined operating state. In the fifth embodiment shown in FIGS. 9 and 10 and the sixth embodiment shown in FIG. 11, a state in which variations in air-fuel ratio among cylinders have occurred corresponds to the predetermined operating state.

Other Embodiments

The embodiment described above may be modified as follows. The embodiments and the following modifications may be combined to the extent that does not cause technical contradiction.

Regarding Sampling Interval of Minute Rotation Durations T30

The sampling interval for minute rotation durations T30, which are input to the mapping, is not limited to 30° CA. For example, the angular interval may be smaller than 30° CA, such as 10° CA. Further, the angular interval does not have to be less than or equal to 30° CA and may be 45° CA, for example.

Regarding Sampling Interval of Upstream-side Average Value Afuave

The sampling interval for upstream-side average values afuave, which are input to the mapping, is not limited to 30° CA. For example, the angular interval may be smaller than 30° CA, such as 10° CA. Further, the angular interval does not have to be less than or equal to 30° CA and may be 45° CA, for example.

Regarding Time Series Data

The time series data of the upstream-side average values Afuave and the time series data of the minute rotation durations T30 used as inputs of the mapping are not limited to those obtained in the 720° CA rotational angular interval. For example, the time series data may be obtained in a rotational angular interval greater than 720° CA. The time series data may also be obtained in an angular interval less than 720° CA.

Regarding Rotation Waveform Variable as Detection Mapping Input

The first and second embodiments divide a rotational angular interval of 720° CA (the first interval), which corresponds to one combustion cycle, into a plurality of intervals (the second intervals) and input the minute rotation durations T30 in the respective second intervals to the detection mapping. However, the present disclosure is not limited to this. For example, the interval between 0 to 720° CA may be set as the first interval, and each of 0 to 20, 40 to 60, 80 to 100, 120 to 140, 160 to 180, . . . , 700 to 720° CA in the first interval may be set as a second interval, and the time required to rotate by the respective second intervals may be input to the detection mapping.

The minute rotation duration that is used as a rotation waveform variable does not have to be the time required to rotate by the second interval. For example, a rotation waveform variable may be a value obtained by dividing the second interval by the minute rotation duration. The variables used as rotation waveform variables do not have to be obtained using the process that normalizes values so that the difference between the local maximum (maximum value) and the local minimum (minimum value) is a fixed value. The filtering performed as pre-processing for the rotation waveform variables as inputs to the mapping is not limited to the example described above. For example, the rotation waveform variables may be subjected to a process that removes the influence of the input shaft 66 of the transmission 64 on the rotation of the crankshaft 24, based on the minute rotation durations of the input shaft 66. Nevertheless, it is not necessary to perform filtering.

Step S226 in the third embodiment shown in FIGS. 6 and 7 uses the cylinder-to-cylinder variable ΔTb(2) and the fluctuation pattern variables FL[02], FL[12] and FL[32] as rotation waveform variables. However, the present disclosure is not limited to this. For example, only one or two of the fluctuation pattern variables FL[02], FL[12] and FL[32] may be used as rotation waveform variables. Further, four or more fluctuation pattern variables, such as fluctuation pattern variables FL[02], FL[12], FL[32] and FL[42], may be included.

Step S264 in the fourth embodiment shown in FIG. 8 uses the minute rotation durations T30 associated with nine different compression top dead center positions as rotation waveform variables. However, the present disclosure is not limited to this. For example, a segment may be set that has compression top dead center of the cylinder that is the target of misfire detection at the midpoint. This segment is at least twice as long as the angular interval between successive compression top dead center positions, and is divided into equal 30° CA degree intervals. The minute rotation durations T30 obtained for these 30° CA intervals may be used as rotation waveform variables. In this modification, it is not necessary to have compression top dead center of the cylinder that is the target of misfire detection at the midpoint. Furthermore, the minute rotation duration may be the time required for rotation by degrees other than 30° CA. Further, instead of the minute rotation duration, the instantaneous rotational speed, which is obtained by dividing the predetermined angular interval by the time required for rotation by the predetermined angular interval, may be used.

Regarding Cylinder-to-Cylinder Variable

The cylinder-to-cylinder variable ΔTb is not limited to the difference between the values that are separated from each other by 720° CA and each of which is a difference between minute rotation durations T30 associated with compression top dead centers of two cylinders that reach compression top dead center in succession to each other. For example, the cylinder-to-cylinder variable ΔTb may be the difference between the values that are separated from each other by 720° CA and each of which is a difference between minute rotation durations T30 associated with compression top dead center positions of two cylinders that are separated from each other by 360° CA. In this case, the cylinder-to-cylinder variable ΔTb(2) is defined by T30(12)−T30(24)−{T30(36)−T30(48)}.

Further, the cylinder-to-cylinder variable may be a value other than the difference between the values that are separated from each other by 720° CA and each of which is a difference between minute rotation durations T30 associated with compression top dead centers of two cylinders. The cylinder-to-cylinder variable may be the difference between the minute rotation duration T30 associated with compression top dead center of the cylinder that is the target of misfire detection and the minute rotation duration T30 associated with compression top dead center of another cylinder.

Further, the cylinder-to-cylinder variable may be a ratio between the minute rotation durations T30 each associated with compression top dead center of one of two cylinders.

The minute rotation duration used to define the cylinder-to-cylinder variable ΔTb is not limited to the time required for rotation by 30° CA and may be the time required for rotation by 45° CA, for example. Nevertheless, the minute rotation duration is preferably the time required for rotation by an angular interval that is less than or equal to the interval between compression top dead center positions.

Further, instead of the minute rotation duration, the instantaneous rotational speed, which is obtained by dividing the predetermined angular interval by the time required for rotation by the predetermined angular interval, may be used.

Regarding Fluctuation Pattern Variable

The fluctuation pattern variable does not have to be defined as in the embodiment described above. For example, the definition of the fluctuation pattern variable may be changed by changing the cylinder-to-cylinder variable ΔTb as described in "Regarding Cylinder-to-Cylinder Variable."

Further, the fluctuation pattern variable does not have to be defined by the ratio between the cylinder-to-cylinder variables ΔTb associated with different compression top dead center positions, and may be defined by the difference between these cylinder-to-cylinder variables ΔTb. In this case, by including the operating point variables of the internal combustion engine 10 in the inputs to the mapping, the calculated value of the misfire variable PR still reflects a change in the magnitude of the fluctuation pattern variable caused by a change in the operating point.

Regarding State Variable of Driveline System as Detection Mapping Input

The processes of FIGS. 2, 9 and 11 use the shift position Sft as the state variable of the driveline system connected to the crankshaft 24, but the present disclosure is not limited to this. For example, the process may use the state of the lockup clutch 62. This state variable may be a binary variable that represents the engaged state and the released state. Alternatively, the state variable may represent the engaged state, the released state, and the slip state.

Further, the state variable of the driveline system may be the oil temperature of the transmission 64, or the rotational speed of the drive wheels 69. Further, more than one state variable of the driveline system may be input to the mapping.

Regarding Air-Fuel Ratio Detection Variable as Detection Mapping Input

The embodiment described above divides a rotational angular interval of 720° CA, which corresponds to one combustion cycle, into a plurality of intervals and inputs the upstream-side average values Afuave in these intervals to the detection mapping. However, the present disclosure is not limited to this. The upstream-side average values Afuave that are input to the detection mapping do not have to be obtained using the second intervals.

The embodiments described above use, as the upstream-side average value Afuave, the average value of the sampled values obtained in each second interval in one cycle. However, the present disclosure is not limited to this. For example, upstream detection values Afu may be sampled in each second interval in a plurality of combustion cycles. The upstream-side average value Afuave may be calculated by obtaining the average of sampled values in each second interval.

The air-fuel ratio detection variable does not have to be the upstream-side average value Afuave, and may be the upstream detection value Afu.

Regarding Moderator Variable for Controlling Combustion Speed of Air-Fuel Mixture as Detection Mapping Input Step S316a uses the ignition timing average value aigave and EGR ratio average value Regrave as moderator variables that control the combustion speed and are input to the detection mapping. However, only one of these two parameters may be used.

The ignition variable, which represents the ignition timing, may be the ignition timing aig, instead of the ignition timing average value aigave. The variable representing the EGR ratio may be the EGR ratio Regr, instead of the EGR ratio average value Regrave.

Further, when the state detection system of the present embodiment is used for a compression ignition internal combustion engine, as will be described in "Regarding Internal Combustion Engine" below, the injection timing or its average value may be used instead of the ignition variable.

The moderator variables that control the combustion speed and are input to the detection mapping are not limited to the variables described above, and may be the valve opening timing or lift amount of the intake valves 16 and the valve opening timing or lift amount of the exhaust valves 26. Alternatively, when cylinder deactivation control is performed to stop combustion of air-fuel mixture in some of the cylinders, the information on the deactivated cylinders may be used. In addition, when the internal combustion engine 10 includes a forced-induction device and a wastegate, the opening degree of the wastegate may be used.

Regarding Road Surface State Variable as Detection Mapping Input

The road surface state variable SR is not limited to a binary variable representing levels of the road roughness, and may be a variable that can take three or more values representing levels of the roughness. The method for generating the road surface state variable SR based on the acceleration Dacc is not limited to the method illustrated in FIG. 3. Instead, the average of the absolute values of the acceleration Dacc measured in a predetermined period may be used. In this case, the road surface state variable SR is a continuous variable.

Values other than the detected value of vertical acceleration of the vehicle VC may be used to quantify the road surface state into the road surface state variable SR. The road surface state may be quantified based on the lateral acceleration or the acceleration in the front-rear direction of the vehicle. Furthermore, as an input to the mapping, the road surface state may be quantified based on any two or all of the three accelerations in the vertical, lateral, and front-rear directions of the vehicle.

The road surface state is quantified into the road surface state variable SR based on the acceleration Dacc detected by the acceleration sensor 88. However, the present disclosure is not limited to this. For example, the road surface state may be quantified using the data on results of analysis of the image data of road surface captured with a camera or the data on reflected radar waves.

A convolutional neural network may be used to analyze road surface image data captured with a camera, for example. The convolutional neural network may include a feature extraction part, which includes alternating convolutional layers and pooling layers, and a classification part, which includes fully connected layers and the softmax function that perform classification. This convolutional neural network takes image data as input and gives an output that is classified according to the level of the road surface roughness.

Alternatively, map data including the information on road surface states and the GPS may be used to obtain the state of the road surface at the current location of the vehicle, which may be used as the road surface state variable SR. The process may also use the air pressure of each wheel. That is, the difference in air pressure between wheels includes information on the deformation of wheels caused by the road surface inclination or unevenness. As such, the difference in air pressure between wheels includes information on the road surface state. Alternatively, the process may use the detection value of a sensor that detects the position of the fluid level in the vehicle, such as a fuel gauge or an oil gauge. The fluid level fluctuation provides information on the road surface unevenness, for example. Further, the process may use the detection value of a sensor that detects the hydraulic pressure of the suspension. The hydraulic pressure provides information on the road surface unevenness and the like, since the suspension operates depending on the unevenness of the road surface.

States other than road surface unevenness may be quantified into a road surface state variable. For example, the level of friction of the road surface, such as the presence or absence of ice, may be quantified. Further, the variable may represent both roughness and the level of friction of the road surface. The level of friction on the road surface may be quantified using the differences in wheel speed between the wheels as inputs. In addition, to determine the presence or absence of ice on the road surface, the information on the outside air temperature or image data captured with a camera may be used.

Regarding Operating Point Variable as Detection Mapping Input

The operating point variables of the internal combustion engine are not limited to the rotational speed NE and the charging efficiency η. For example, the intake air amount Ga and rotational speed NE may be used. Further, when the process is performed for a compression ignition internal combustion engine, as will be described in "Regarding Internal Combustion Engine" below, the injection amount and rotational speed NE may be used. The inputs to the detection mapping do not have to include an operating point variable. For example, it is not necessary to include an operating point variable in the input variables to calculate an accurate value of the combustion state variable when the state detection system of the present disclosure is used for an internal combustion engine mounted on a series hybrid vehicle, which will be described in "Regarding Vehicle" below and the internal combustion engine is controlled to a specific operating point.

Regarding Detection Mapping Input

The inputs to the detection mapping used in addition to the rotation waveform variables, which include instantaneous speed parameters, and the road surface state variable are not limited to those used in the embodiments and modifications described above. For example, parameters relating to the environment in which the internal combustion engine 10 is placed may be used. Specifically, the detection mapping may use the atmospheric pressure, which is a parameter that affects the proportion of oxygen in the intake air. The detection mapping may use the intake air temperature, which is a parameter that affects the combustion speed of the air-fuel mixture in the combustion chambers 18. Further, the detection mapping may use the humidity, which is a parameter that affects the combustion speed of the air-fuel mixture in the combustion chambers 18. The humidity may be identified using a humidity sensor, or from the detection value of a sensor that detects the state of the wiper or raindrop. The detection mapping may also use data on the state of an auxiliary device mechanically connected to the crankshaft 24.

As described in "Regarding Operating Point Variable as Detection Mapping Input," the inputs to the detection mapping do not have to include the operating point of the internal combustion engine 10. For example, it is not necessary to include the operating point when the internal combustion engine is mounted on a series hybrid vehicle, which will be described in "Regarding Internal Combustion Engine" below, and the operating point of the internal combustion engine is controlled within a narrow range.

Each of the dimensions of the inputs to the neural network and the inputs to the regression formula described in "Regarding Machine Learning Algorithm" below does not have to be a single physical amount or a fluctuation pattern variable FL. For example, some of the different types of physical amounts and the fluctuation pattern variables FL that are used as inputs to the detection mapping in the embodiments described above do not have to be input directly to the neural network or the regression formula. Instead, their principal components obtained by principal component analysis may be input directly to the neural network or the regression formula. In this case, not only some of the inputs to the neural network or the regression formula, but all of the inputs may be principal components. When the principal components are input to the detection mapping, the mapping data 76a, 126a includes data defining a detection mapping that defines principal components.

Regarding Response Process

The embodiment described above operates the warning light 90 and thereby notifies that misfires have occurred through visual information. However, the present disclosure is not limited to this. For example, the process may operate a speaker and thereby notify that misfires have occurred through audio information. Further, the controller 70 shown in FIG. 1 may include a communication device 79, which is operated to send a signal indicating that misfires have occurred to a mobile terminal of the user. This may be achieved by installing in the user's mobile terminal an application program that performs the notification process.

The response process is not limited to the notification process. For example, the response process may be an operation process that operates, in response to the information indicating that misfires have occurred, the operation portion (the combustion operation portion) for controlling the combustion of the air-fuel mixture in the combustion chambers 18 of the internal combustion engine 10. Specifically, the operation portion may be an ignition device 22 and operated to advance the ignition timing of the misfiring cylinder. Further, the operation portion may be a fuel injection valve 20 and operated to increase the amount of fuel injected in the misfiring cylinder.

Regarding Execution Device

The execution device is not limited to a device that includes the CPU 72 and the ROM 74, or the CPU 122 and the ROM 124, and executes software processing. For example, the execution device may include an application-specific hardware circuit (e.g., ASIC) that performs at least part of the process performed by software in the embodiment described above. That is, the execution device may have any of the following configurations (a) to (c). (a) The execution device includes a processor, which executes all the processes described above following a program, and a program storage device such as a ROM, which stores the program (including a non-transitory computer-readable recording medium). (b) The execution device includes a processor, which performs some of the processes described above following a program, a program storage device, and a dedicated hardware circuit that performs the rest of the processes. (c) The execution device includes a dedicated hardware circuit that performs all of the processes described above. The execution device may include a plurality of software processing devices including a processor and a program storage device, and a plurality of dedicated hardware circuits.

Regarding Storage Device

In the embodiment described above, the storage device storing the mapping data 76a, 126a is separate from the storage device storing the misfire detection program, the misfire detection main program, and the imbalance detection main program. In other words, the mapping data is stored in a storage device other than the ROM 74 or ROM 124. However, the present disclosure is not limited to this.

Regarding Data Analysis Device

In the second embodiment, the center 120 may perform steps S24 and S28b in section (a) of FIG. 5, instead of steps S162 and S164 in section (b) of FIG. 5. Likewise, in the fourth embodiment shown in FIG. 8 and the sixth embodiment shown in FIG. 11, the center 120 may send the vehicle an instruction to perform the notification process so that the notification process is performed by the vehicle.

In the second embodiment, the process of section (b) of FIG. 5 may be performed by a mobile terminal of the user. This may be achieved by installing in the user's mobile terminal an application program that performs the process of section (b) of FIG. 5. In this case, the effective distance for data transmission at S150 in section (a) of FIG. 5 and S166 in section (b) of FIG. 5 may be set to be equivalent to the vehicle length, so that the transmission of the vehicle ID can be omitted. The same applies to the fourth and sixth embodiments.

Mapping Data of First and Second Embodiments

The activation functions h(x) in the intermediate layer do not have to be identical in all dimensions.

The neural network in the mapping that outputs probabilities of misfires is not limited to a neural network having one intermediate layer. For example, the mapping may include a neural network having two or more intermediate layers. When a greater number of intermediate layers are present, the use of the system illustrated in FIG. 4 is particularly effective in reducing the computation load on the controller 70.

The activation functions h(x) do not have to be hyperbolic tangent. For example, the logistic sigmoid function may be used. The activation functions f(x) in the processes of FIGS. 2 and 5 do not have to be hyperbolic tangent. For example, the logistic sigmoid function may be used. In this case, the outputs of the activation functions f(x) may be used as probabilities P without using the softmax function, so that the probabilities P(1) to P(4) that misfires have occurred in respective cylinders #1 to #4 are independent of one another and take values of 0 to 1.

The mapping that outputs misfire probabilities does not have to use a neural network. For example, the principal component analysis may be performed on the data obtained to be used as inputs to the mapping, such as minute rotation durations T30, so as to reduce the dimensions of the data. Instead of the input-side coefficients wFij described above, coefficients that define the reduced number of parameters may be used.

Regarding Mapping Data of Third Embodiment in FIGS. 6 and 7

The mapping data that defines the mapping used for the computation performed in the vehicle may be the data that defines the mapping used at S264 in section (b) of FIG. 8.

For example, at step S264 in FIG. 8, the number of intermediate layers in the neural network is defined to be more than two layers ($\alpha > 2$), but the present disclosure is not limited to this.

Regarding Mapping Data of Fourth Embodiment in FIG. 8

In this embodiment, the activation functions h, h1, h2, ..., hα are ReLU, and the output activation function is the softmax function. The present disclosure is not limited to this. For example, the activation functions h, h1, h2, ... hα may be hyperbolic tangents. Further, the activation functions h, h1, h2, ..., hα may be logistic sigmoid functions.

Furthermore, the output activation function in the output layer may be the logistic sigmoid function. In this case, the output layer may include only one node, and the output variable may be the misfire variable PR. The presence or absence of abnormality may be determined by determining that the engine has abnormality when the value of the output variable is greater than or equal to a predetermined value.

Mapping Data of Fifth and Sixth Embodiments

At S316a in FIGS. 9 and 11, the neural network may have two or more intermediate layers.

A step S316a in FIGS. 9 and 11, the formula defines that the neural network has more than two intermediate layers ($\alpha > 2$), but the present disclosure is not limited to this. In particular, to reduce the computation load on the controller 70, the neural network preferably has only one or two intermediate layers.

This embodiment uses the hyperbolic tangent as the activation functions h, f, h1, h2, ..., hα, but the present disclosure is not limited to this. For example, some or all of the activation functions h, h1, h2, ..., hα may be ReLU or logistic sigmoid functions.

The detection mapping that outputs the imbalance ratios Riv does not have to be learned for a situation in which the fuel injection amount of only one of the cylinders deviates from the intended amount. For example, the detection mapping may be learned for a situation in which the fuel injection amount deviates from the intended amount in two cylinders. In this case, the magnitude of the first order component of the rotational frequency of the crankshaft 24 may be included in the inputs to the mapping.

Regarding Machine Learning Algorithm

The machine learning algorithm does not have to use a neural network. For example, a regression formula may be used. The regression formula is equivalent to a neural network that does not include an intermediate layer. Alternatively, a support vector machine may be used. In this case, the magnitude of the output value is irrelevant to the determination, and the determination on whether a misfire has occurred depends on whether the output value is positive. In other words, the machine learning using the support vector machine is different from the machine learning in which the combustion state variable can take three or more values that represent levels of misfire probability.

Regarding Mapping Data Generation

As the training data, the embodiment described above uses the data obtained while the internal combustion engine 10 is operated with the crankshaft 24 connected to the dynamometer through the torque converter 60 and the transmission 64. However, the present disclosure is not limited to this. For example, the training data may be obtained while the internal combustion engine 10 operates in the vehicle VC.

Regarding External Transmission Process

At step S266 shown in FIG. 8, the value of the misfire variable PR is sent, but the present disclosure is not limited to this. For example, the center 120 may transmit the values of the original variables yR (1) and yR (2), which are inputs to the softmax function that served as the output activation function. Further, the center 120 may perform steps S228 to S236 shown in section (a) of FIG. 8, and the center 120 may transmit the result of determination on the presence or absence of abnormality to the vehicle.

Regarding Predetermined Operating State

The state to be detected by the state detection system (the detection target) does not have to be misfires or imbalance in air-fuel ratio among cylinders, and may be any operating state of the internal combustion engine 10 that is accompanied by variations in combustion state among cylinders. For example, when an intake valve or an exhaust valve sticks open (the valve does not close completely), the associated cylinder has a compression leak, or insufficient compression of intake air. Such compression leak causes variations in combustion state among cylinders, increasing the fluctuation of the rotation of the crankshaft 24. As such, the detection mapping that takes the rotation waveform variables and the road surface state variable as inputs can be used to accurately detect a compression leak, with consideration given to the effects of the road surface state.

Regarding Internal Combustion Engine

The fuel injection valves used in the embodiment described above are direct injection valves, which inject fuel in the combustion chambers 18. However, the present disclosure is not limited to this. For example, port injection valves that inject fuel into the intake passage 12 may be used. Further, the internal combustion engine may include both port injection valves and direct injection valves.

The internal combustion engine is not limited to a spark ignition internal combustion engine, and may be a compression ignition internal combustion engine, which uses light oil as fuel, for example.

The internal combustion engine does not have to form the driveline system. For example, the state detection system may be used for the internal combustion engine that is mounted on a series hybrid vehicle in which the crankshaft is mechanically coupled to an on-board electrical generator, and the force of the internal combustion engine is not transmitted to the drive wheels 69.

Regarding Vehicle

The vehicle is not limited to a vehicle in which the internal combustion engine is the only component that generates thrust for the vehicle. The vehicle may be a series hybrid vehicle described in "Regarding Internal Combustion Engine," a parallel hybrid vehicle, or a series-parallel hybrid vehicle.

The driveline system arranged between the crankshaft and the drive wheels is not limited to a stepped transmission, and may be a continuously variable transmission, for example.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A state detection system for an internal combustion engine, the state detection system being configured to be used for the internal combustion engine mounted on a vehicle to detect a predetermined operating state of the internal combustion engine that is accompanied by variations in combustion state among cylinders, the state detection system comprising:
a storage device configured to store snapping data that defines a detection mapping, wherein
the detection mapping takes, as inputs, rotation waveform variables and a road surface state variable to output a combustion state variable,
the rotation waveform variables include information on a difference between cylinders in rotational speed of a crankshaft of the internal combustion engine during periods in which the respective cylinders generate combustion torque,
the road surface state variable relates to a state of a road surface on which the vehicle is traveling,
the combustion state variable relates to a level of variations in combustion state among the cylinders, and
the detection mapping outputs a value of the combustion state variable by computing a combination of the rotation waveform variables and the road surface state variable based on parameters learned by machine learning; and
an execution devices configured to perform an obtainment process and a determination process, wherein
the obtainment process obtains values of the rotation waveform variables based on an output of a sensor that detects rotational behavior of the crankshaft, and obtains a value of the road surface state variable based on an output of a sensor that detects a road surface state, and
the determination process determines whether the internal combustion engine is in the predetermined operating state based on an output value of the detection mapping that takes, as inputs, the values of the rotation waveform variables and the value of the road surface state variable, which are obtained in the obtainment process.

2. The state detection system for an internal combustion engine according to claim 1, wherein the predetermined operating state is a state in which a misfire has occurred.

3. The state detection system for an internal combustion engine according to claim 1, wherein the predetermined operating state is a state in which variations in air-fuel ratio among the cylinders have occurred.

4. The state detection system for an internal combustion engine according to claim 1, wherein the road surface state variable indicates whether the road surface on which the vehicle is traveling is a paved road or an unpaved road.

5. The state detection system for an internal combustion engine according to claim 1, wherein the execution device is configured to, when the determination process determines that the internal combustion engine is in the predetermined operating state, perform a response process that operates hardware to respond to the predetermined operating state.

6. The state detection system for an internal combustion engine according to claim 1, wherein
the determination process includes an output value calculation process that calculates the combustion state variable,
the combustion state variable is the output value of the detection mapping that takes, as inputs, the values of the rotation waveform variables and the value of the road surface state variable, which are obtained in the obtainment process,
the execution device includes a first execution device mounted on the vehicle and a second execution device mounted on an apparatus that is separate from the vehicle,
the first execution device is configured to perform the obtainment process, and a vehicle-side reception process that receives a signal based on a calculation result of the output value calculation process, and
the second execution device is configured to perform the output value calculation process, and
an external transmission process that transmits to the vehicle the signal based on the calculation result of the output value calculation process.

7. A data analysis device comprising:
a second execution device; and
a storage device, wherein
the data analysis device is separate from a vehicle on which an internal combustion engine and a first execution device are mounted,
the first execution device the second execution device, and the storage device the execution device configure a state detection system for the internal combustion engine, the state detection system being configured to be used for the internal combustion engine to detect a predetermined operating state of the internal combustion engine that is accompanied by variations in combustion state among cylinders,
the storage device is configured to store mapping data that defines a detection mapping,
the detection mapping takes, as inputs, rotation waveform variables and a road surface state variable to output a combustion state variable,
the rotation waveform variables include information on a difference between cylinders in rotational speed of a crankshaft of the internal combustion engine during periods in which the respective cylinders generate combustion torque,
the road surface state variable relates to a state of a road surface on which the vehicle is traveling,
the combustion state variable relates to a level of variations in combustion state among the cylinders,
the detection mapping outputs a value of the combustion state variable by computing a combination of the rotation waveform variables and the road surface state variable based on parameters learned by machine learning,
the first execution devices and the second execution device are configured to perform an obtainment process and a determination process,
the obtainment process obtains values of the rotation waveform variables based on an output of a sensor that detects rotational behavior of the crankshaft, and obtains a value of the road surface state variable based on an output of a sensor that detects a road surface state,
the determination process determines whether the internal combustion engine is in the predetermined operating state based on an output value of the detection mapping that takes, as inputs, the values of the rotation waveform variables and the value of the road surface state variable, which are obtained in the obtainment process,
the determination process includes an output value calculation process that calculates the combustion state variable,
the combustion state variable is the output value of the detection mapping that takes, as inputs, the values of the rotation waveform variables and the value of the road surface state variable, which are obtained in the obtainment process,
the first execution device is configured to perform the obtainment process, and a vehicle-side reception process that receives a signal based on a calculation result of the output value calculation process, and
the second execution device is configured to perform the output value calculation process, and an external transmission process that transmits to the vehicle the signal based on the calculation result of the output value calculation process.

8. A vehicle, comprising:
an internal combustion, and
a first execution device, wherein
a second execution device and a storage device are mounted on an apparatus that is separate from the vehicle,
the first execution device, the second execution device, and the storage device the execution device configure a state detection system for the internal combustion engine, the state detection system being configured to be used for the internal combustion engine to detect a predetermined operating state of the internal combustion engine that is accompanied by variations in combustion state among cylinders,
the storage device is configured to store mapping data that defines a detection mapping,
the detection mapping takes, as inputs, rotation waveform variables and a road surface state variable to output a combustion state variable,
the rotation waveform variables include information on a difference between cylinders in rotational speed of a crankshaft of the internal combustion engine during periods in which the respective cylinders generate combustion torque,
the road surface state variable relates to a state of a road surface on which the vehicle is traveling,
the combustion state variable relates to a level of variations in combustion state among the cylinders,
the detection mapping outputs a value of the combustion state variable by computing a combination of the rotation waveform variables and the road surface state variable based on parameters learned by machine learning, the first execution devices and the second execution device are configured to perform an obtainment process and a determination process, the obtainment process obtains values of the rotation waveform variables based on an output of a sensor that detects rotational behavior of the crankshaft, and obtains a value of the road surface state variable based on an output of a sensor that detects a road surface state, the determination process determines whether the internal combustion engine is in the predetermined operating state based on an output value of the detection mapping that takes, as inputs, the values of the rotation waveform variables and the value of the road surface state variable, which are obtained in the obtainment process, the determination process includes an output value calculation process that calculates the combustion state variable, the combustion state variable is the output value of the detection mapping that takes, as inputs, the values of the rotation waveform variables and the value of the road surface state variable, which are obtained in the obtainment process, the first execution device is configured to perform the obtainment process, and a vehicle-side reception process that receives a signal based on a calculation result of the output value calculation process, and the second execution device is configured to perform the output value calculation process, and an external transmission process that transmits to the vehicle the signal based on the calculation result of the output value calculation process.

9. A method for detecting a state of an internal combustion engine, the method being used for the internal combustion engine mounted on a vehicle to detect a predetermined operating state of the internal combustion engine that is accompanied by variations in combustion state among cylinders, the method comprising:

storing mapping data that defines a detection mapping in a storage device, wherein the detection mapping takes, as inputs, rotation waveform variables and a road surface state variable to output a combustion state variable, the rotation waveform variables include information on a difference between cylinders in rotational speed of a crankshaft of the internal combustion engine during periods in which the respective cylinders generate combustion torque, the road surface state variable relates to a state of a road surface on which the vehicle is traveling, the combustion state variable relates to a level of variations in combustion state among the cylinders, and the detection mapping outputs a value of the combustion state variable by computing a combination of the rotation waveform variables and the road surface state variable based on parameters learned by machine learning;

obtaining, using an execution device, values of the rotation waveform variables based on an output of a sensor that detects rotational behavior of a crankshaft and a value of the road surface state variable based on an output of a sensor that detects a road surface state; and determining, using the execution device, whether the internal combustion engine is in the predetermined operating state based on an output value of the detection mapping that takes, as inputs, the values of the rotation waveform variables and the value of the road surface state variable.

\* \* \* \* \*